United States Patent
Lee et al.

(10) Patent No.: US 11,051,269 B2
(45) Date of Patent: Jun. 29, 2021

(54) ELECTRONIC DEVICE FOR SUPPORTING MULTIPLE SUBSCRIBER IDENTITY MODULES AND METHOD THEREFOR

(71) Applicant: Samsung Electronics Co., Ltd., Gyeonggi-do (KR)

(72) Inventors: Wooyong Lee, Gyeonggi-do (KR); Yeungseob Shin, Gyeonggi-do (KR); Yongwoo Lee, Gyeonggi-do (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 0 days.

(21) Appl. No.: 16/520,457

(22) Filed: Jul. 24, 2019

(65) Prior Publication Data
US 2020/0037281 A1    Jan. 30, 2020

(30) Foreign Application Priority Data
Jul. 24, 2018   (KR) .................. 10-2018-0085869

(51) Int. Cl.
  *H04W 60/00*    (2009.01)
  *H04W 36/00*    (2009.01)
  (Continued)

(52) U.S. Cl.
  CPC ....... *H04W 60/005* (2013.01); *H04L 65/1016* (2013.01); *H04L 65/1069* (2013.01);
  (Continued)

(58) Field of Classification Search
  CPC ...... H04L 29/06; H04W 12/00; H04W 36/00; H04W 8/18; H04W 8/20
  See application file for complete search history.

(56) References Cited

U.S. PATENT DOCUMENTS 8,743,887 B2   6/2014   Balasubramanian et al.
8,780,857 B2   7/2014   Balasubramanian et al.
(Continued)

FOREIGN PATENT DOCUMENTS

KR    10-2017-0003647 A   1/2017
WO    2018/077243 A1   5/2018

OTHER PUBLICATIONS

International Search Report dated Nov. 14, 2019.

*Primary Examiner* — Anez C Ebrahim
(74) *Attorney, Agent, or Firm* — Cha & Reiter, LLC

(57) ABSTRACT

In accordance with an aspect of the disclosure, an electronic device is provided. The electronic device comprises a first subscriber identity module (SIM) and a second SIM, a first communication circuitry configured to perform wireless communication over a cellular network, a second communication circuitry configured to perform wireless communication over a Wi-Fi network, and at least one processor operatively connected with the first SIM, the second SIM, the first communication circuitry, and the second communication circuitry. The at least one processor is configured to perform a packet-based call associated with the first SIM using the first communication circuitry, and transmit a first re-registration message for internet protocol multimedia subsystem (IMS) re-registration for the second SIM to a network associated with the second SIM using the second communication circuitry, during the packet-based call associated with the first SIM.

20 Claims, 14 Drawing Sheets

(51) Int. Cl.
*H04L 29/06* (2006.01)
*H04W 8/18* (2009.01)
*H04W 8/20* (2009.01)
*H04W 12/43* (2021.01)

(52) U.S. Cl.
CPC ............ *H04W 8/183* (2013.01); *H04W 8/20* (2013.01); *H04W 12/43* (2021.01); *H04W 36/0022* (2013.01)

(56) References Cited

U.S. PATENT DOCUMENTS

| | | |
|---|---|---|
| 9,706,448 B2 | 7/2017 | Naik et al. |
| 9,854,004 B2 | 12/2017 | Bharadwaj |
| 10,085,274 B2 | 9/2018 | Shi et al. |
| 2009/0103455 A1 | 4/2009 | Balasubramanian et al. |
| 2009/0116447 A1 | 5/2009 | Balasubramanian et al. |
| 2015/0271317 A1* | 9/2015 | Nelson .............. H04M 1/72519 715/753 |
| 2015/0282026 A1* | 10/2015 | Gupta ................... H04W 48/16 370/331 |
| 2015/0327207 A1 | 11/2015 | Bharadwaj |
| 2016/0249301 A1 | 8/2016 | Xiao et al. |
| 2016/0353330 A1 | 12/2016 | Naik et al. |
| 2017/0208462 A1* | 7/2017 | Zaifuddin ........... H04L 65/1096 |
| 2018/0049213 A1* | 2/2018 | Gholmieh ......... H04W 72/1215 |
| 2018/0115978 A1 | 4/2018 | Shi et al. |
| 2019/0261299 A1 | 8/2019 | Liu et al. |

\* cited by examiner

ELECTRONIC DEVICE FOR SUPPORTING MULTIPLE SUBSCRIBER IDENTITY MODULES AND METHOD THEREFOR

CROSS-REFERENCE TO RELATED APPLICATION(S)

This application is based on and claims priority under 35 U.S.C. § 119(a) of a Korean patent application number 10-2018-0085869, filed on Jul. 24, 2018, in the Korean Intellectual Property Office, the disclosure of which is incorporated by reference herein in its entirety.

BACKGROUND

1. Field

The disclosure relates to an electronic device for supporting multiple subscriber identity modules (SIMs) and a method therefor.

2. Description of Related Art

An electronic device may include an identity module for providing various services, such as user authentication, charging, and a security function, to its user. The identify module may include, for example, a subscriber identification module (SIM). Accordingly, it is important to make efficient usage of radio frequency resources.

The above information is presented as background information only to assist with an understanding of the present disclosure. No determination has been made, and no assertion is made, as to whether any of the above might be applicable as prior art with regard to the present disclosure.

SUMMARY

In accordance with an aspect of the disclosure, an electronic device is provided. The electronic device comprises a first subscriber identity module (SIM) and a second SIM, a first communication circuitry configured to perform wireless communication over a cellular network, a second communication circuitry configured to perform wireless communication over a Wi-Fi network, and at least one processor operatively connected with the first SIM, the second SIM, the first communication circuitry, and the second communication circuitry. The at least one processor is configured to perform a packet-based call associated with the first SIM using the first communication circuitry, and transmit a first re-registration message for internet protocol multimedia subsystem (IMS) re-registration for the second SIM to a network associated with the second SIM using the second communication circuitry, during the packet-based call associated with the first SIM.

In accordance with another aspect of the disclosure, an electronic device is provided. The electronic device comprises a first subscriber identity module (SIM) and a second SIM, a first communication circuitry configured to perform wireless communication over a cellular network, a second communication circuitry configured to perform wireless communication over a Wi-Fi network, and at least one processor operatively connected with the first SIM, the second SIM, the first communication circuitry, and the second communication circuitry. The at least one processor is configured to transmit a first re-registration message for internet protocol multimedia subsystem (IMS) re-registration for the second SIM using the second communication circuitry when detecting a voice over long term evolution (VoLTE) call associated with the first SIM, determine whether voice over Wi-Fi (VoWiFi) for the second SIM is supported, and when the VoWiFi for the second SIM is supported, perform the VoLTE call associated with the first SIM using the first communication circuitry.

In accordance with another aspect of the disclosure, an electronic device is provided. The electronic device comprises a first subscriber identity module (SIM) storing first subscriber information, a second SIM storing second subscriber information, a first communication circuitry configured to provide first wireless communication, a second communication circuitry configured to provide second wireless communication, at least one processor operatively connected with the first communication circuitry and the second communication circuitry, and a memory operatively connected with the at least one processor. The memory stores instructions, when executed, causes the at least one processor to perform a plurality of operations. The plurality of operations comprises generating a first registration request message based at least in part on the first subscriber information, transmitting the first registration request message to a first external server using the first communication circuitry, generating a second registration request message based at least in part on the second subscriber information, transmitting the second registration request message to a second external server using the first communication circuitry, connecting voice communication based at least in part of the first subscriber information or data-based voice communication using the first communication circuitry, after transmitting the first registration request message, generating a third registration request message based at least in part on the second subscriber information, after connecting the voice communication or the data-based voice communication, and transmitting the third registration request message to the second external server using the second communication circuitry.

Other aspects, advantages, and salient features of the disclosure will become apparent to those skilled in the art from the following detailed description, which, taken in conjunction with the annexed drawings, discloses certain embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
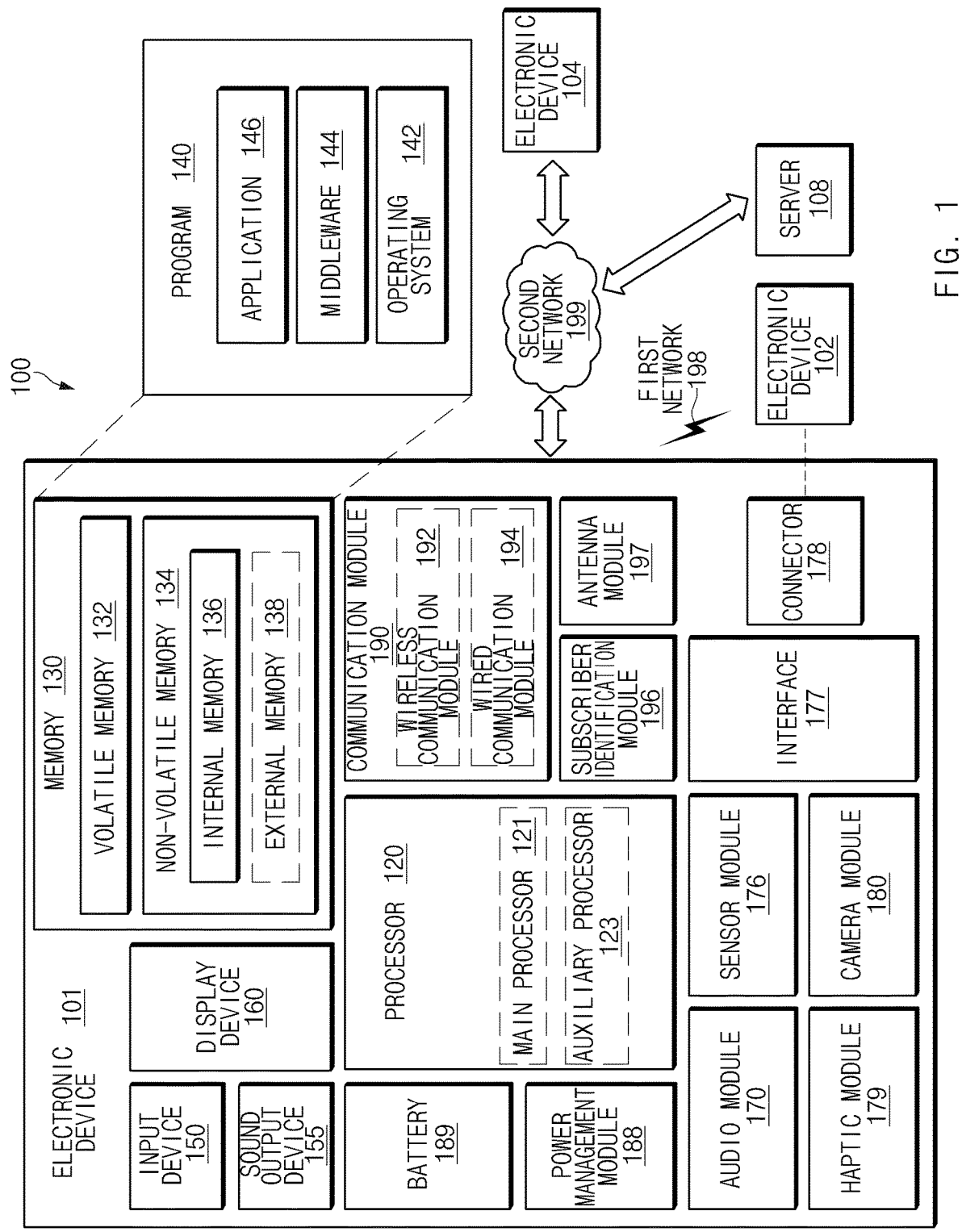
FIG. 1 is a block diagram illustrating an electronic device in a network environment according to certain embodiments.

Hereinafter, certain embodiments of the disclosure may be described with reference to accompanying drawings. Accordingly, those of ordinary skill in the art will recognize that modification, equivalent, and/or alternative on the certain embodiments described herein can be variously made without departing from the scope and spirit of the disclosure.

An electronic device may include a single SIM or may include a plurality SIMs such as a dual SIM. For example, a billing policy associated with a first SIM of the electronic device may specialize in a voice call, and a billing policy associated with a second SIM of the electronic device may specialize in data communication. The user may select a desired billing policy by using the first SIM or the second SIM if necessary.

To enhance sound quality and efficiency of a voice call over a circuit switched (CS) network, voice over internet protocol (VoIP) technology based on an internet protocol (IP) can be used. Unlike voice over CS, a voice may be exchanged through a data packet in the VoIP technology. The VoIP technology may be applied to various network platforms based on a packet data network. For example, for a VoIP in long term evolution (LTE) wireless communication, voice over LTE (VoLTE) may be used. With the development and deployment of a mobile communication system, a voice call may be performed using packet data communication through an IP multimedia subsystem (IMS) as well as data communication.

An electronic device may use a limited radio frequency (RF) resource, or antenna, for a plurality of SIMs. When an RF resource is monopolized by one of the plurality of SIMs, data communication associated with the other SIMs may be limited. In this case, the electronic device may fail to provide an IMS service for the other SIMs. Furthermore, although an IMS service for the second SIM is not supported, IMS service availability of the second SIM may fail to be reported to a network.

Certain aspects of the disclosure may address at least the above-mentioned issues and may provide at least the advantages described below. Accordingly, an aspect of the disclosure is to provide an electronic device for providing an IMS service for a plurality of SIMs through hand-over of some SIMs using a short-range wireless network.

Accordingly, another aspect of the disclosure may provide an electronic device for matching SIM state information between a server and the electronic device by re-registering information associated with a SIM not used for a voice call.

Generally, when the first SIM 201 monopolizes a first RF resource, such as an antenna for accessing the cellular network, the second SIM 202 can re-register using a Wi-Fi network. The first SIM 201 can monopolize the RF resource by engaging in a high priority data packet transaction, such as a phone call. As a result of the high priority, the second SIM 202 is restricted from accessing the first RF resource, and may not be able to access the cellular network altogether. This can prevent the second SIM 202 from even engaging in IMS service. To alleviate this, the second SIM 202 uses the accesses a Wi-Fi network to re-register with a second server.

Figure 2A:
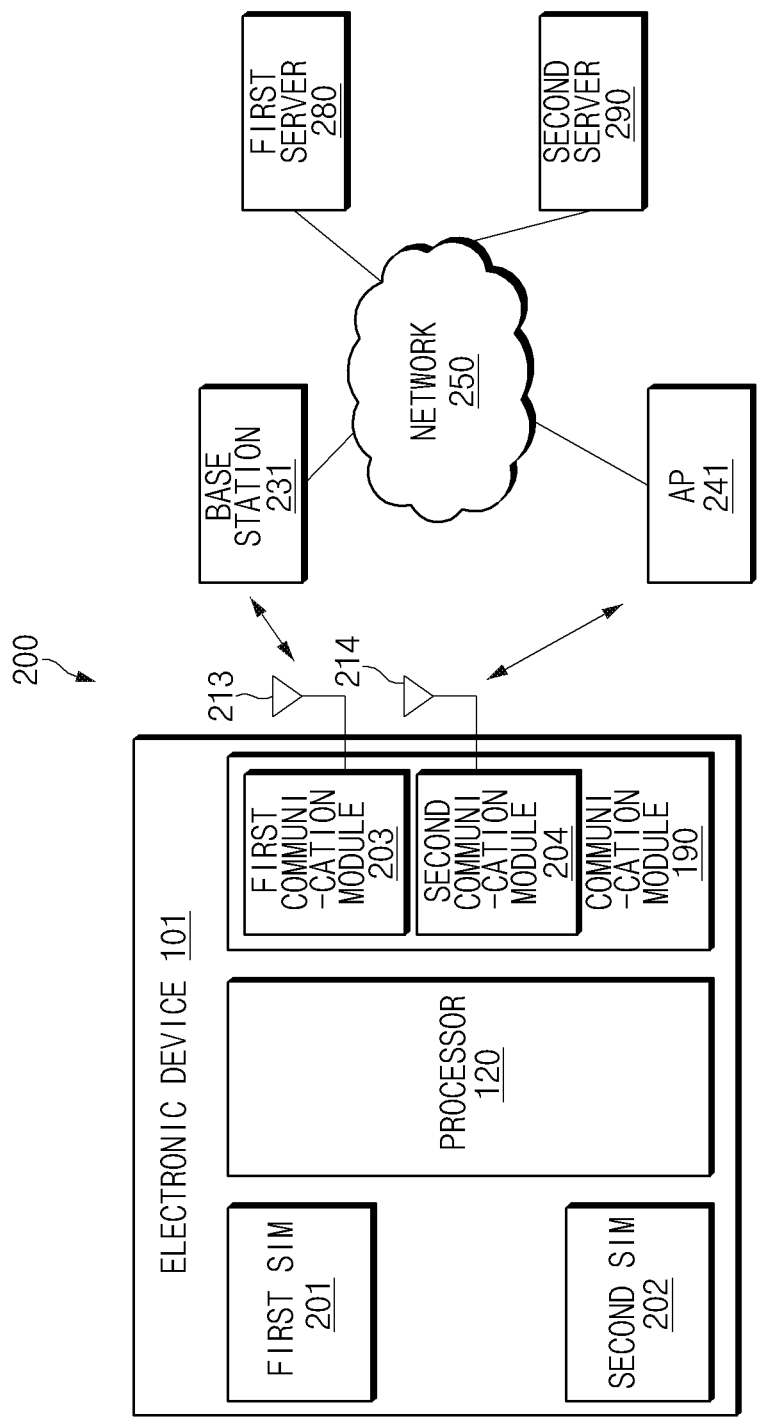
FIG. 2A is a block diagram illustrating a network environment for supporting a dual SIM according to certain embodiments.
Figure 2B:
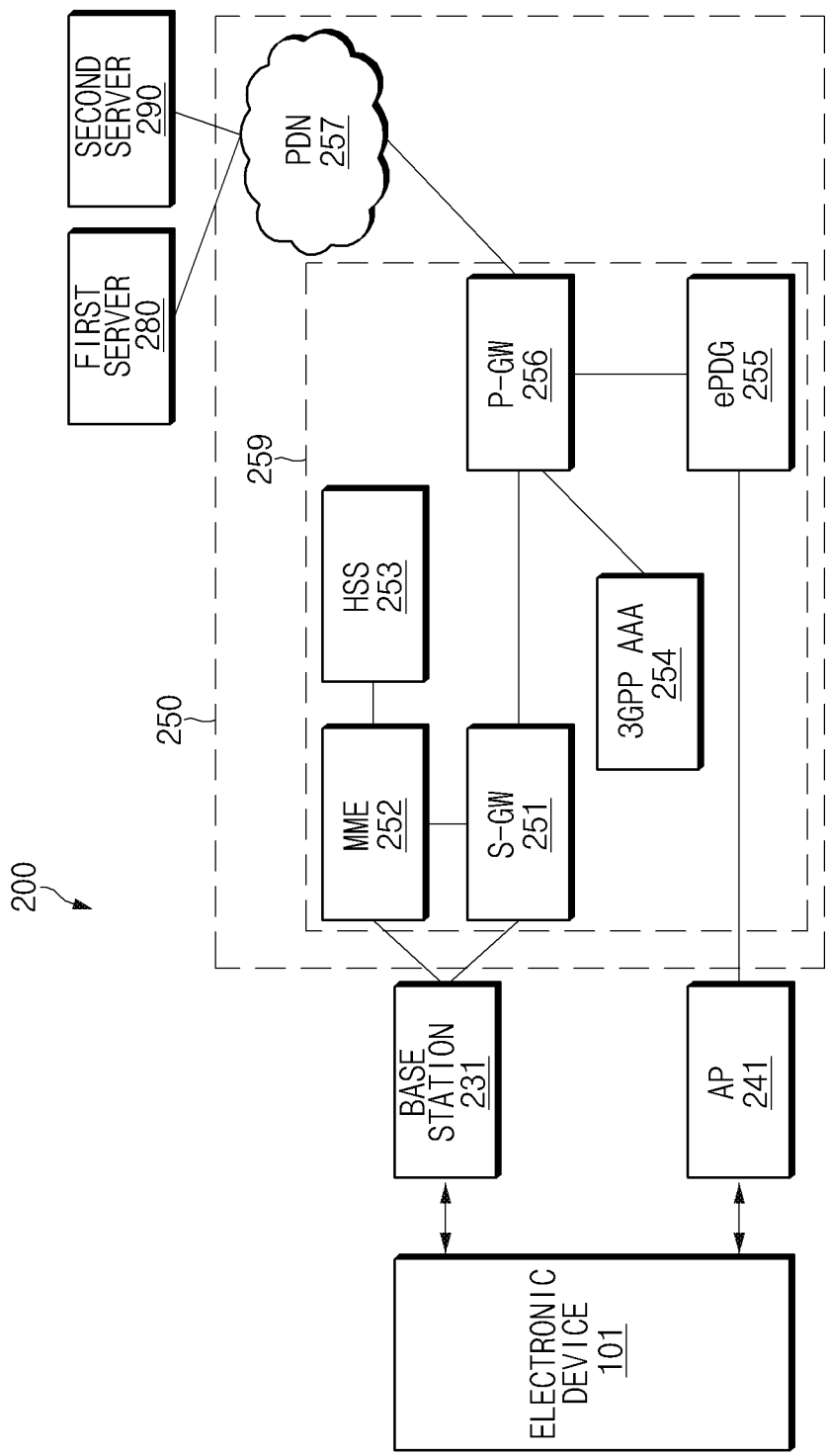
FIG. 2B is a block diagram illustrating a network environment according to certain embodiments.
Figure 3:
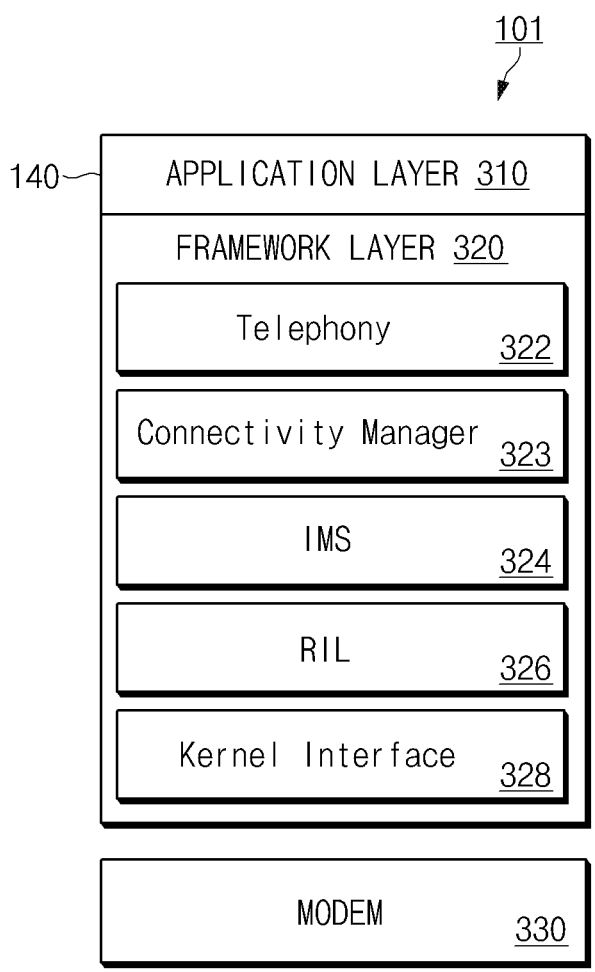
FIG. 3 is a drawing illustrating a structure of layers for processing a data packet according to certain embodiments.
Figure 4:
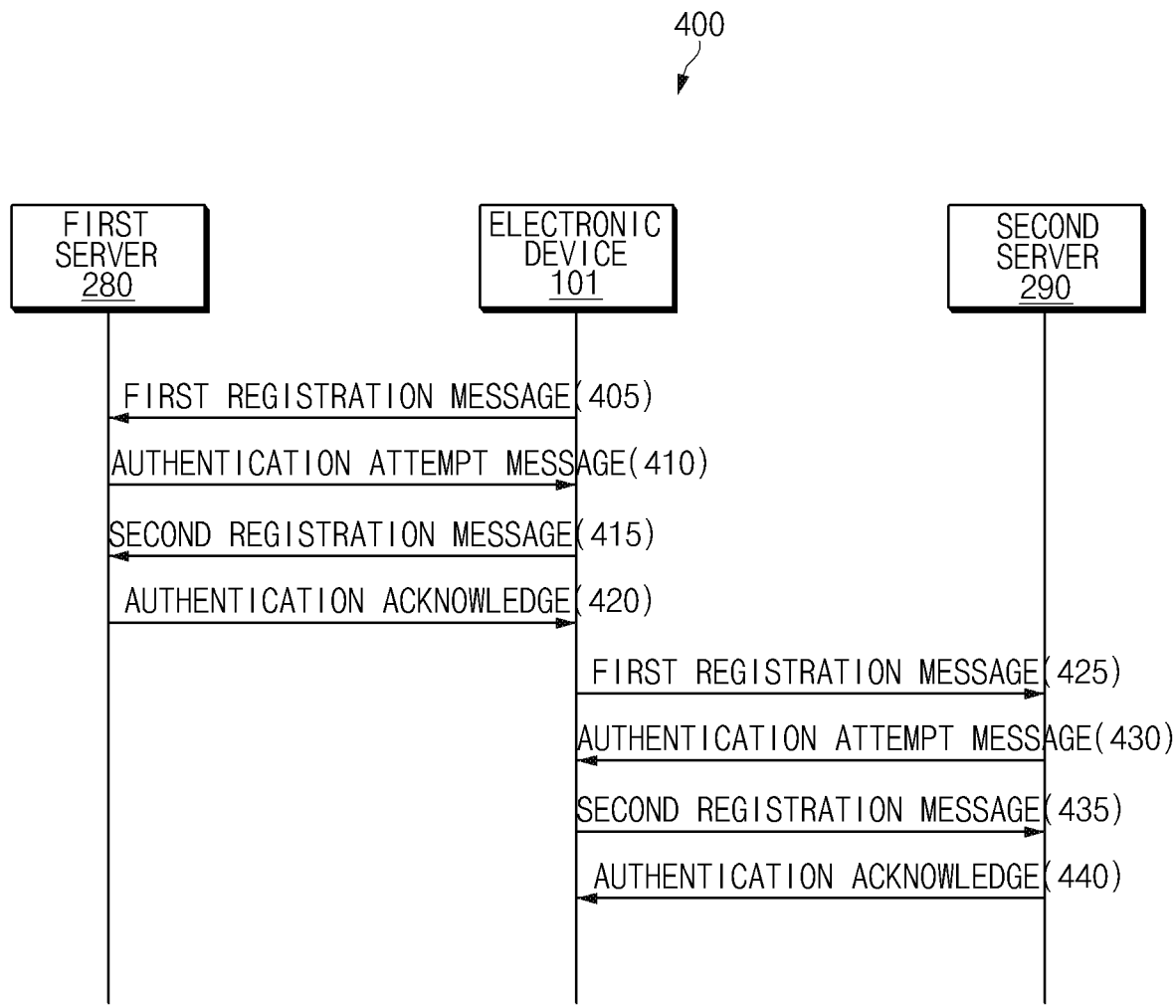
FIG. 4 is a signal sequence diagram illustrating a method for registering a dual SIM according to certain embodiments.
Figure 5:
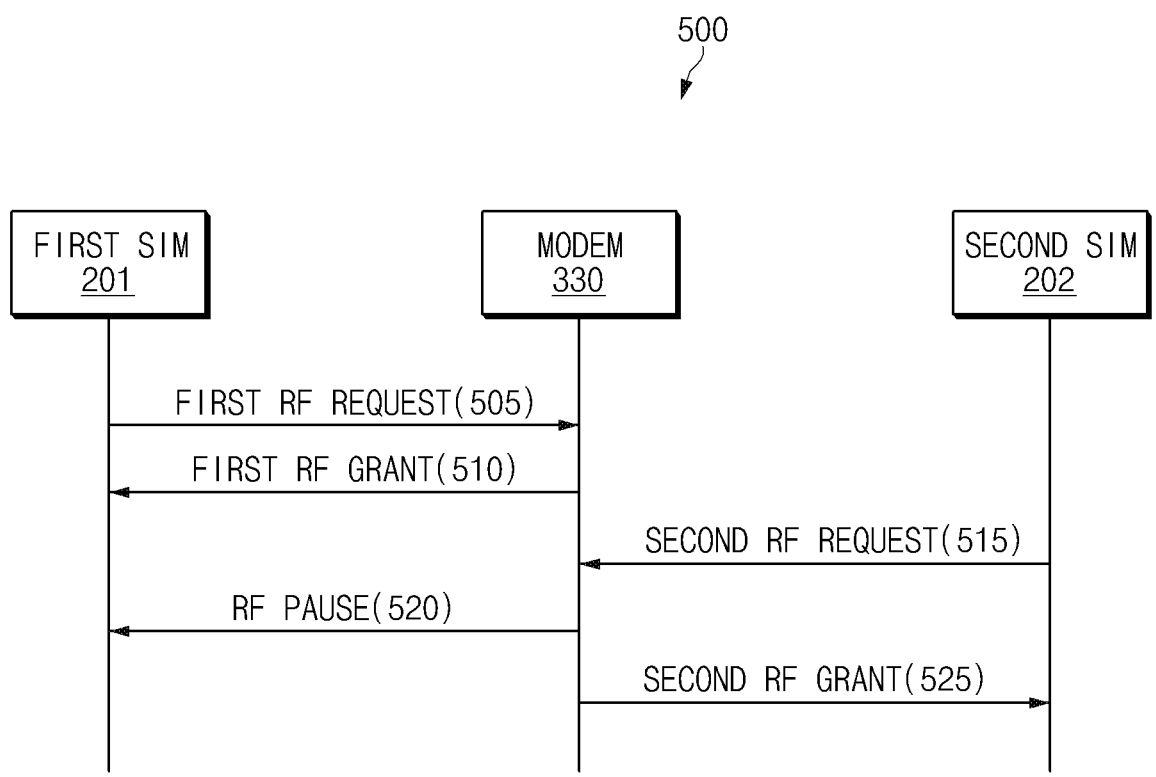
FIG. 5 is a signal sequence diagram illustrating packet data transmission based on priority according to certain embodiments.

FIGS. 1 and 2A will describe the electronic device 101. FIG. 2B describes the network. FIGS. 3-5 describe usage of an RF resource by a first SIM 201 and a second SIM 202. FIGS. 6-13 describe the circumstance where the first SIM 201 monopolizes an RF resource, and the second SIM 202 re-registering using a Wi-Fi network.

FIG. 1 is a block diagram illustrating an electronic device 101 in a network environment 100 according to certain embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

FIG. 2A is a block diagram illustrating a network environment 200 for supporting a dual SIM according to certain embodiments.

Referring to FIG. 2A, in the network environment 200 (e.g., a network environment 100 of FIG. 1), an electronic device 101 (e.g., an electronic device 101 of FIG. 1) may receive an internet protocol (IP) multimedia subsystem (IMS) service from a first server 280 or a second server 290 over a network 250 (e.g., a second network 199 of FIG. 1).

The IMS service may include a data transmission and reception service based on an IP. For example, the IMS service may include a voice call service based on an IP such as a voice over IP (VoIP) (e.g., a voice call service based on packet data). The electronic device 101 may perform the VoIP using a radio frequency (RF) resource, such as an antenna. For example, when supporting the long term evolution (LTE) specification defined by the $3^{rd}$ generation partnership project (3GPP), the electronic device 101 may perform a voice call through a voice over LTE (VoLTE) service. Alternatively, when supporting wireless-fidelity (Wi-Fi), the electronic device 101 may perform a voice call through a voice over Wi-Fi (VoWiFi) service based on a wireless local area network (WLAN) (e.g., a Wi-Fi network).

According to an embodiment, the electronic device 101 may include a communication module 190 (e.g., a communication module 190 of FIG. 1). For example, the communication module 190 may include a baseband processor (or a communication processor) (e.g., a modem). The communication module 190 may include a first communication module 203 and a second communication module 204. The first communication module 203 may be configured to perform wireless communication over a cellular network (e.g., a network based on the 3GPP or LTE specification). For example, the first communication module 203 may perform cellular wireless communication by transmitting a signal to a base station 231 (e.g., an evolved node B (eNB) or a next generation node B (gNB)) or receiving a signal from the base station 231, using a first antenna 213 (e.g., an antenna module 197 of FIG. 1). The first communication module 203 may be referred to as, for example, a communication processor. The second communication module 204 may be configured to perform wireless communication over a WLAN (e.g., a non-3GPP network, a Wibro network, or a Wi-Fi network). For example, the second communication module 204 may perform wireless communication over the WLAN by transmitting a signal to an access point (AP) 241 and receiving a signal from the AP 241, using a second antenna 214 (e.g., the antenna module 197 of FIG. 1). The second communication module 204 may be referred to as, for example, a Wi-Fi module. The first communication module 203 and the second communication module 204 may be implemented as one chip or chips independent of each other. According to an embodiment, the first communication module 203 and the second communication module 204 may use different RF resources. For example, the first communication module 203 may perform wireless communication using the first antenna 213 and a first RF resource, and the second communication module 204 may perform wireless communication using the second antenna 214 and a second RF resource. At least a portion of the first RF resource and the second RF source might not have the same frequency bands. According to an embodiment, the electronic device 101 may transmit the signal processed by the communication module 190 to a network 250 through the base station 231 and/or the AP 241. The electronic device 101 may receive and/or process a signal from the network 250 using the communication module 190.

According to certain embodiments, the electronic device 101 may support a plurality of SIMs. For example, the electronic device 101 may support a dual SIM. For example, the electronic device 101 may include a first SIM 201 and a second SIM 202. Each of the first SIM 201 and the second SIM 202 may correspond to a subscriber identification module 196 of FIG. 1. The first SIM 201 and the second SIM 202 may provide information associated with user authentication or a security function.

According to an embodiment, the first SIM 201 and the second SIM 202 may correspond to different IMS servers or may correspond to different identification numbers (e.g., different phone numbers). Network operators (e.g., mobile network operators (MNOs)) associated with the first SIM 201 and the second SIM 202 may differ from each other. For example, when performing communication using the first SIM 201, the electronic device 101 may receive an IMS service from the first server 280 associated with the first SIM 201 or a first MNO associated with the first SIM 201. For example, when performing communication using the second SIM 202, the electronic device 101 may receive an IMS service from the second server 290 associated with the second SIM 202 or a second MNO of the second SIM 202. For another example, an identification number (e.g., a phone number) of the electronic device 101 corresponding to the first SIM 201 may be 010-1234-xxxx, and an identification number of the electronic device 101 corresponding to the second SIM 202 may be 010-4321-xxxx.

Alternatively, the first SIM 201 and the second SIM 202 may correspond to the same IMS server. For example, the first SIM 201 and the second SIM 202 may be registered (e.g., perform IMS registration) with the same server (e.g., the first server 280 or the second server 290).

The electronic device 101 may perform a packet-based VoIP service such as VoLTE or VoWiFi using the first SIM 201 or the second SIM 202. For example, VoIP service capabilities associated with the first SIM 201 and the second SIM 202 may differ from each other. For example, the first SIM 201 may support VoLTE and VoWiFi, whereas the second SIM 202 may support only VoLTE, or vice versa in another example. For another example, the first SIM 201 and the second SIM 202 may both support VoLTE and VoWiFi. According to an embodiment, VoIP service capabilities of the first SIM 201 and the second SIM 202 may be differently defined according to a policy of a service provider (e.g., an MNO) associated with each of the first SIM 201 and the second SIM 202.

Each of the first server 280 and the second server 290 may provide an IMS service (e.g., packet-based data transmission and reception) to the electronic device 101. In the disclosure, each of the first server 280 and the second server 290 may be referred to as an IMS server. Each of the first server 280 and the second server 290 may be a single entity or a set of a plurality of entities. The electronic device 101 may establish a session with the first server 280 and/or the second server 290 using a message based on a session initiation protocol (SIP).

According to an embodiment, the network 250 may refer to an architecture for transmitting data between the electronic device 101 and the first server 280 and/or the second server 290.

The electronic device 101 may further includes at least one processor 120 (hereinafter, the term "processor" shall be understood to refer to the singular and plural contexts).

In certain embodiments, the electronic device 101 may have only one antenna 213 for accessing a cellular network. Resource contention for the antenna 213 can occur when the first SIM 201 and the second SIM 202 attempted to access the cellular network at the same time. The resource contention can be resolved by use of priority. However, when one of the SIMs 201 or 203 is engaged in an on-going communication with high priority, it effectively prevents the other SIM from accessing the network associated with the antenna. This can effectively prevent provisioning of services to the other SIM. Accordingly, the other SIM can use the other antenna, e.g., antenna 214 to re-register using another network FIG. 2B is a block diagram illustrating a network environment according to certain embodiments. Referring to FIG. 2B, a network 250 may include a packet data network (PDN) 257 and an evolved packet core (EPC) 259. For example, the EPC 259 may include a home subscriber server (HSS) 253, a 3GPP-authentication, authorization and accounting (AAA) server 254, a packet data network gateway (P-GW) 256, a serving gateway (S-GW) 251, a mobility management entity (MME) 252, and an evolved packet data gateway (ePDG) 255.

The base station 231 may be linked with an electronic device 101 over a wireless channel and may play a similar role to an existing radio network controller/base station controller (RNC/BSC). The MME 252 may be a node for controlling a control plane of the EPC 259 and may perform various functions such as connection and disconnection of a radio bearer. The S-GW 251 may be a node for controlling a user plane for an LTE radio access network (RAN) in the EPC 259, and may operate as a mobility anchor for the electronic device 101 or may generate or remove a data bearer upon control of the MME 252. The P-GW 256 may be a node for connecting the EPC 259 and the PDN 257, and may assign an IP address to the electronic device 101 and may apply a quality of service (QoS) to the electronic device 101. The HSS 253 may be a node having subscriber information. The 3GPP-AAA server 254 may be a node for providing authentication, authorization, policy control, and routing information to the P-GW 256 for 3GPP Wi-Fi access. When the electronic device 101 hands off between an LTE network and a Wi-Fi network, the ePDG 255 may be a node which aims to maintain access of the electronic device 101 and provide a continuous service to the electronic device 101.

The electronic device 101 may receive data from the PDN 257 via the P-GW 256, the S-GW 251, and the base station 231 and may transmit data to the PDN 257. For example, the electronic device 101 may communicate with a first server 280 and/or a second server 290 over the PDN 257.

The base station 231 may hand off the electronic device 101 to the AP 241, or vice versa. The electronic device 101 may communicate with the 3GPP-AAA server 254 to perform authentication. In an embodiment in which a proxy mobile IP version 6 (IPv6) protocol is used when the authentication succeeds, the ePDG 255 may transmit a proxy binding update (PBU) message to the P-GW 256. The PBU message may be a message for requesting to change a path for transmitting and receiving a signal at the electronic device 101. Receiving the PBU message, the P-GW 256 may change a transmission and reception path associated with the electronic device 101 and may transmit a proxy binding acknowledge message as a response to the PBU message to the ePDG 255. In this case, for example, the electronic device 101 may be connected to the PDN 257 via the AP 241, the ePDG 255, and the P-GW 256.

The ePDG 255 may be connected to the P-GW 256 through a general packet radio service tunneling protocol (GTP) path rather than a proxy mobile IPv6 path. In an embodiment, the ePDG 255 may transmit a create session request message to the P-GW 256 rather than the PBU message and may receive a create session response message from the P-GW 256, thus opening a packet radio service tunneling protocol path. In this case, the electronic device 101 may be connected to the PDN 257 via the base station 231, the S-GW 251, and the P-GW 256.

The structure of the network shown in FIG. 2B may be changed in various manners. For example, the various components of FIG. 2B are combined, subdivided, or omitted, and an additional component may be added according to specific necessity.

According to an embodiment, in the EPC 259, a QoS may be applied for each evolved packet system (EPS) bearer. One EPS bearer may be used to transmit IP flows, each of which has the same QoS requirements. According to an embodiment, the electronic device 101 may transmit voice data to the first server 280 or the second server 290 via the S-GW 251 or the P-GW 256 using a dedicated EPS bearer. Alternatively, the electronic device 101 may receive voice data from the first server 280 or the second server 290 using the dedicated EPS bearer. According to an embodiment, the electronic device 101 may transmit voice data to the first server 280 or the second server 290 via the ePDG 255 and the P-GW 256 using a dedicated bearer. Alternatively, the electronic device 101 may receive voice data from the first server 280 or the second server 290 using the dedicated bearer.

The electronic device 101 may be registered with the first server 280 or the second server 290 over the network 250. The registration may mean that, for example, the PDN 257 is established between the electronic device 101 and the first server 280 or the second server 290 by the P-GW 256. The electronic device 101 may initiate a registration operation with the first server 280 or the second server 290 when booted or may initiate a registration operation when a network environment of the electronic device 101 is changed. The first server 280 or the second server 290 may determine whether the electronic device 101 is able to perform a VoIP, based on whether the electronic device 101 is registered.

In certain embodiments, when the cellular network is accessible by one of the SIMs (such as when the other SIM is engaged in a phone call), the other SIM can re-register using the AP 241 with the second server 290.

FIG. 3 is a drawing illustrating a structure of layers for processing a data packet according to certain embodiments.

Referring to FIG. 3, instructions stored in a memory (e.g., a memory 130 of FIG. 1) are executed by a processor (e.g., a processor 120 of FIG. 1), data may be processed by a processor 120 executing a program 140 (e.g., a program 140 of FIG. 1) including the instructions. The data processed by the processor 120 executing the program 140 may be transmitted through a modem 330, and data received through the modem 330 may be processed by the processor 120 executing the program 140. For example, the modem 330 may be included in a communication module 190 or an auxiliary processor 123 of FIG. 1.

According to an embodiment, the memory storing the program 140 may be referred to as software or a module. The program 140 may include an application layer 310 (e.g., an application 146 of FIG. 1), a framework layer 320 (e.g., an operating system 142 and/or middleware 144 of FIG. 1), a kernel interface 328 (e.g., the operating system 142 of FIG. 1).

The application layer 310 may include the application 146 of FIG. 1. For example, the application layer 310 may include a contact application or a call application. The application 310 may perform a function of providing various services (e.g., an IMS service, an internet service, and the like), provided from an external network (e.g., a first server 280 or a second server 290 of FIG. 2A), to a user.

The framework layer 320 may perform data processing for delivering data about the IMS service or the internet service to the modem 330. The framework layer 320 may include a telephony 322, a connectivity manager 323, an IMS 324, and a radio interface layer 326.

The telephony 322 may provide an application programming interface (API) for accessing (e.g., transmitting and receiving data) the modem 330 via the RIL 326 at the application layer 310. The telephony 322 may include, for example, a call origination/termination service, a data service, a SIM recognition service, a short message service (SMS), a network search and connection service, or the like. The API provided by the telephony 322 may vary with a type (e.g., global system for mobile communications (GSM), code division multiple access (CDMA), or IMS) of network to which data is transmitted via the modem 330.

The connectivity manager 323 may manage a wireless connection or a direct connection between an electronic device 101 and an external electronic device. The connectivity manager 323 may monitor a network connection (e.g., Wi-Fi, general packet radio service (GPRS), universal mobile telecommunications system (UMTS), or LTE).

The IMS 324 may process data associated with an IMS service. For example, when a call application is executed in the electronic device 101 and when the electronic device 101 receives a user input for requesting a voice call from another electronic device from the user, the IMS 324 may generate a message (e.g., an SIP INVITE message) for requesting the voice call and may deliver the generated message to the model 330 via the RIL 326. For another example, when the electronic device 101 receives a message for requesting the voice call via the modem 330 from the other electronic device, the IMS 324 may deliver the received message to the application layer 310 to notify the user of the electronic device 101 that the call request is received.

The RIL 326 may provide an interface associated with wireless communication between the program 140 and the modem 330. For example, applications included in the application layer 310 may control the modem 330 through the RIL 326 using the API provided from the telephony 322 and may transmit and receive with the modem 330.

The kernel interface 328 may control and/or manage system resources (e.g., a processor 120, a communication module 190, and/or a memory 130 of FIG. 1) used to execute an operation or function implemented by applications of the application layer 310 and the framework layer 320. The kernel interface 328 may access each separate component of the electronic device 101 to provide an interface capable of controlling or managing the system resources.

The modem 330 may process a transmitted (modulate) and received (demodulate) message (e.g., an SIP INVITE message) in a baseband. The modem 330 may transmit the data processed in the baseband to the first server 280 or the second server 290 via a communication module 190 of FIG. 2A.

FIG. 4 is a signal sequence diagram 400 illustrating a method for registering a dual SIM according to certain embodiments.

According to certain embodiments, an electronic device 101 (e.g., an electronic device 101 of FIG. 2A) may register each SIM (e.g., a first SIM 201 or a second SIM 202 of FIG. 2A) with a server (e.g., a first server 280 or a second server 290 of FIG. 2A). For example, the electronic device 101 may register the first SIM 201 with the first server 280 and may register the second SIM 202 with the second server 290.

In operation 405, the electronic device 101 may transmit a first registration message to the first server 280. For example, the electronic device 101 may transmit the first registration message over a network (e.g., a network 250 of FIG. 2A) using a communication module (e.g., a communication module 190 of FIG. 2A). According to an embodiment, the electronic device 101 may generate the first registration message based on at least a portion of SIM information stored in the first SIM 201.

For example, the first registration message may include subscriber information (e.g., IP multimedia private identity (IMPI) and/or IMS private user identify (IMPU)) associated with the first SIM 201. The first registration message may be, for example, an SIP REGISTER message including information of the electronic device 101 (e.g., an IP address of the electronic device 101). For example, the first registration message may include access network information (e.g., P-access-network-information (PANI)) associated with the first SIM 201. For example, the access network information may include information indicating a cellular network. The access network information (e.g., the PANI) may include information indicating 3GPP. For example, the access network information may be included in a header of the first registration message (e.g., an SIP header).

According to an embodiment, in operation 410, the electronic device 101 may receive an authentication attempt message from the first server 280. For example, the electronic device 101 may receive the authentication attempt message over the network 250 using the communication module 190. For example, the authentication attempt message may be a 401 authentication SIP message including information (e.g., a random number value) for authenticating the electronic device 101.

According to an embodiment, in operation 415, the electronic device 101 may transmit a second registration message to the first server 280. The electronic device 101 may transmit the second registration message over the network 250 using the communication module 190. The second registration message may be, for example, an SIP INVITE message including a response generated based on the information included in the authentication attempt message.

According to an embodiment, in operation 420, the electronic device 101 may receive an authentication acknowledge message from the first server 280. For example, the electronic device 101 may receive the authentication acknowledge message over the network 250 using the communication module 190. For example, the authentication acknowledge message may be an SIP 200 OK message indicating that the registration of the electronic device 101 based on the first SIM 201 is completed.

According to an embodiment, the electronic device 101 may perform operations 425, 430, 435, and 440 which are similar to operations 405, 410, 415, and 420, registering the second SIM 202 with the second server 290 over the network 250. A description of operations 425, 430, 435, and 440 may refer to operations 405, 410, 415, and 420.

FIG. 5 is a signal sequence diagram 500 illustrating packet data transmission based on priority according to certain embodiments. The FIG. 5, an embodiment where the first SIM 201 and the second SIM 202 both seek to use antenna 213 (and related circuitry) to access a cellular network.

Referring again to FIG. 2A, according to an embodiment, a first communication module 203 may be configured to perform wireless communication based on the cellular specification (e.g., 3GPP, LTE, or UMTS). A second communication module 204 may be configured to perform wireless communication based on the WLAN specification (e.g., the IEEE specification).

According to an embodiment, the first communication module 203 may be configured to use one RF resource (e.g., a first antenna 213 and a related RF circuit) at the same time. For example, the first communication module 203 may transmit and receive packet data using one RF antenna (e.g., the first antenna 213). According to an embodiment, a first SIM 201 and a second SIM 202 may want to use the first communication module 203 at the same time. In this case, because only one RF resource is assigned to the first communication module 203, the first communication module 203 may process first data associated with the first SIM 201 and second data associated with the second SIM 202 based on priorities.

Referring to FIG. 5, a modem 330 of an electronic device 101 (e.g., a modem 330 of FIG. 3) may control transmission and reception of the first data and the second data based on priorities. For example, it may be assumed that the modem 330 has one RF resource (e.g., the first antenna 213 of FIG. 2A).

In operation 505, the modem 330 may receive a first RF request associated with the first SIM 201. For example, the first RF request may be a measurement request for identifying an RF electric field state.

In operation 510, the modem 330 may transmit a first RF grant corresponding to the first RF request.

In operation 515, the modem 330 may receive a second RF request associated with the second SIM 202. For example, the second RF request may include a tracking area update (TAU) request. The second RF request is higher in priority than the first RF request.

In operation 520, the modem 330 may declare an RF pause in data associated with the first SIM 201. For example, when the second RF request having a higher priority is received while data associated with the first RF request is processed, the processing (e.g., transmission and reception) of the data associated with the first RF request may pause. According to the RF pause, the data associated with the first SIM 201 may be suspended. For example, a packet data network (PDN) associated with the first SIM 201 may be suspended.

Alternatively, if the second RF request from the second SIM 202 has a lower priority than the data from the first SIM 201, the modem 330 may transmit a pause to the second SIM 202.

In operation 525, the modem 330 may transmit a second RF grant for the second RF request. Thus, the processing of the data associated with the first RF request may be suspended, and the data associated with the second RF request having a high priority may be processed.

A priority associated with the RF request may be defined as Table 1 below.

TABLE 1

| Item | Note | Priority |
|---|---|---|
| Paging | identify an incoming call for each certain period | 1 |
| Measure | identify a current RF electric field state | 2 |
| SIB-Read | receive configuration information from a network | 3 |
| Signaling | exchange a message between a network and a terminal | 4 |
| L1_High | specific operation internally determined in a slot | 5 |
| Cell-search | search for an available network | 6 |
| PS-data | operate a data packet stream | 7 |

According to an embodiment, the electronic device 101 may perform a voice call (e.g., VoLTE) based on packet data associated with the first SIM 201 over a cellular network (e.g., a 3GPP network). In this case, the voice call may be included in the PS-data item of Table 1 above. Thus, while the voice call based on the packet data associated with the first SIM 201 is performed, an RF resource associated with the first communication module 203 may be substantially monopolized by the voice call based on the packet data associated with the first SIM 201, because no other item has a higher priority.

For example, because the processing of the data associated with the first SIM 201 has the highest priority, processing of the data associated with the second SIM 202 may pause or be suspended. Thus, while the voice call based on the packet data associated with the first SIM 201 is performed, the electronic device 101 may fail to receive information associated with the second SIM 202 from a second server 290 using the first communication module 203 or may fail to transmit the information associated with the second SIM 202 to the second server 290. For example, the electronic device 101 may fail to provide an IMS service for the second SIM 202.

To avoid the foregoing, the data associated with the second SIM can be transmitted using another RF resource, e.g., antenna 214, using short range wireless communications.

Figure 6:
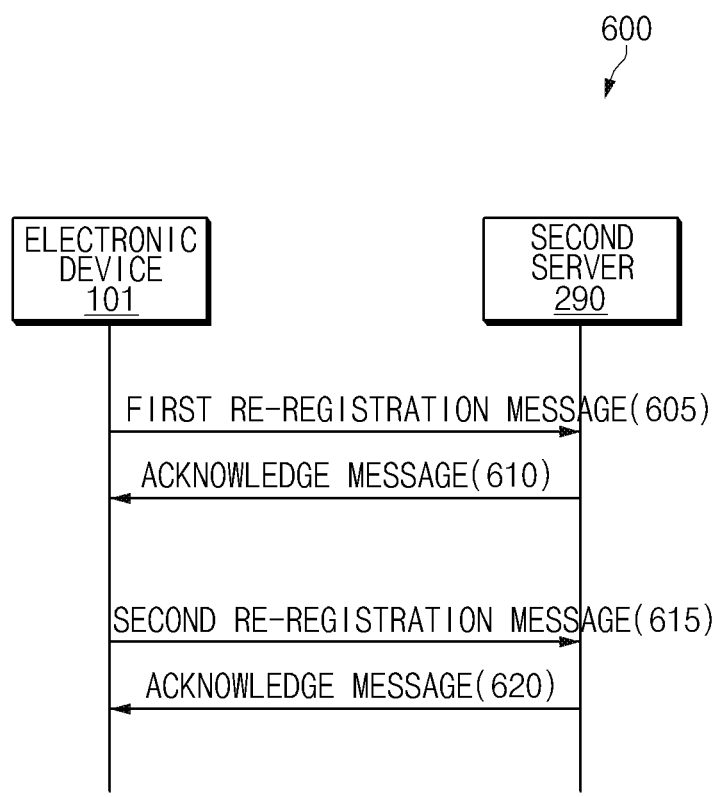
FIG. 6 is a signal sequence diagram illustrating a method for changing an access network according to certain embodiments.

FIG. 6 is a signal sequence diagram illustrating a method for changing an access network according to certain embodiments.

As described in detail with reference to FIG. 5, because data associated with a second SIM 202 (e.g., a second SIM 202 of FIG. 2A) is suspended while a voice call is performed, an electronic device 101 (e.g., an electronic device 101 of FIG. 2A) may re-register the second SIM 202 over a WLAN (e.g., a non-3GPP network, a Wibro network, or a Wi-Fi network).

According to an embodiment, a network provider (e.g., an MNO) associated with the second SIM 202 may support an interworking structure between a cellular communication network (e.g., a communication network based on 3GPP standard) and the WLAN (e.g., a communication network based on non-3GPP standard or a communication network based on an IEEE standard). For example, the network provider (e.g., the MNO) associated with the second SIM 202 may support an ePDG to support hand-over between the WLAN (e.g., the communication network based on non-3GPP standard or the communication network based on an IEEE standard) and the cellular communication network (e.g., the communication network based on 3GPP standard). For example, the electronic device 101 may re-register the second SIM 202 with a second server 290 (e.g., a second server 290 of FIG. 2A) over the WLAN to process data associated with the second SIM 202 using a second communication module 204. According to an embodiment, to provide an IMS service for the second SIM 202, the electronic device 101 may perform re-registration (IMS re-registration) for the second SIM 202. For example, the electronic device 101 may re-register the second SIM 202 over the WLAN (e.g., a Wi-Fi network) to hand over the IMS re-registration of the second SIM 202 from the cellular network (e.g., an LTE network) to the WLAN.

Referring to FIG. 6, according to an embodiment, in operation 605, the electronic device 101 may transmit a first re-registration message associated with the second SIM 202 to the second server 290. For example, the electronic device 101 may transmit the first re-registration message (e.g., an SIP REGISTER message) using a second communication module (e.g., a second communication module 204 of FIG. 2A). For example, the electronic device 101 may transmit the first re-registration message using a second antenna (e.g., a second antenna 214 of FIG. 2A) different from a first antenna (e.g., a first antenna 213 of FIG. 2A) associated with a first communication module (e.g., a first communication module 203 of FIG. 2A).

The electronic device 101 may generate the first re-registration message based on at least a portion of SIM information stored in the second SIM 202. For example, the first re-registration message may include subscriber information (e.g., IP multimedia private identity (IMPI) and/or IMS private user identity (IMPU)) associated with the second SIM 202.

The first re-registration message may include access network information (e.g., PANI) associated with the second SIM 202. For example, the access network information may include information indicating a WLAN (e.g., Wi-Fi). The access network information (e.g., the PANI) may include information indicating IEEE. For example, the access network information may be included in a header of the first re-registration message (e.g., an SIP header).

In operation 610, the second server 290 may transmit an acknowledge message for the first re-registration message to the electronic device 101. For example, the first re-registration message may be a 200 OK message based on an SIP. According to an embodiment, in operations 605 and 610, the electronic device 101 may change the access network information associated with the second SIM 202 to information about a non-3GPP network (e.g., Wi-Fi). The electronic device 101 may perform IMS re-registration based on the changed network information to receive an IMS service associated with the second SIM 202 from the second server over a non-3GPP access network.

When a voice call associated with the first SIM 201 is performed over a network based on 3GPP standard (e.g., an LTE network), operations 605 and 610 may be performed. When the voice call associated with the first SIM 201 is terminated, the second SIM 202 may be handed over again to the network based on 3GPP standard. For example, to ensure mobility and/or match states between a network and a terminal, the electronic device 101 may change the access network information of the second SIM 202 to information about the network based on 3GPP standard.

In operation 615, the electronic device 101 may transmit a second re-registration message associated with the second SIM 202 to the second server 290. For example, the electronic device 101 may transmit the second re-registration message using the first communication module (e.g., the first communication module 203 of FIG. 2A).

The second re-registration message may include access network information (e.g., PANI) associated with the second SIM 202. For example, the access network information may include information indicating a cellular network (e.g., a network based on 3GPP standard). The access network information (e.g., the PANI) may include information indicating 3GPP. For example, the access network information may be included in a header of the second re-registration information (e.g., an SIP header).

According to an embodiment, in operation 620, the second server 290 may transmit an acknowledge message for the second re-registration message to the electronic device 101. For example, the second re-registration message may be a 200 OK message based on an SIP. Through operations 615 and 620, the electronic device 101 may change the access network information associated with the second SIM 202 to information about the network based on 3GPP standard and may receive an IMS service associated with the second SIM 202 from the second server 290 over the network based on 3GPP standard. Accordingly, even though the first SIM 201 virtually monopolizes the first antenna 213, the electronic device 101 can provide IMS service for the second SIM 202 through second antenna 214.

Hereinafter, a description will be given of certain embodiments with reference to FIGS. 7 to 13.

Figure 7:
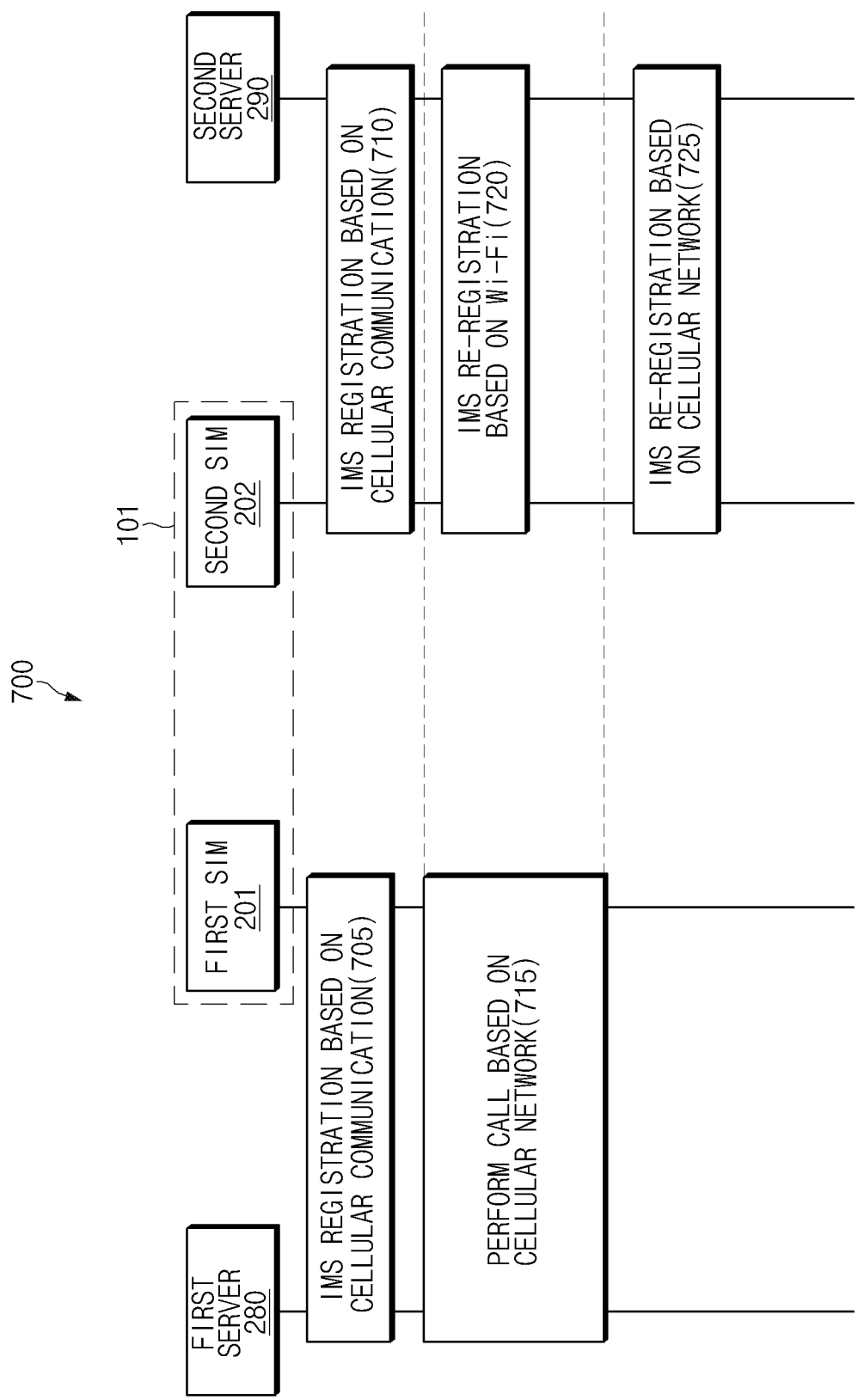
FIG. 7 is a signal sequence diagram illustrating a hand-over method of a second SIM according to certain embodiments.

FIG. 7 is a signal sequence diagram 700 illustrating a hand-over method of a second SIM according to certain embodiments. In FIG. 7, the first SIM 201 engages in a call based on a cellular network that terminates. During the call, the second SIM 202 re-registers based on the wi-fi, because the first SIM 201 has a virtual monopoly on the antenna for accessing the cellular network. When the call based on the cellular network by the first SIM 201 terminates, the second SIM 202 re-registers on the cellular network using the antenna for the cellular network.

According to an embodiment, in operation 705, an electronic device 101 (e.g., an electronic device 101 of FIG. 2A) may register a first SIM 201 (e.g., a first SIM 201 of FIG. 2A) with a first server 280 (e.g., a first server 280 of FIG. 2A) based on cellular communication. For example, the electronic device 101 may perform registration by performing operations 405, 410, 415, and 420 of FIG. 4.

In operation 710, the electronic device 101 may register a second SIM 202 (e.g., a second SIM 202 of FIG. 2A) with a second server 290 (e.g., a second server 290 of FIG. 2A) based on the cellular communication. For example, the electronic device 101 may perform registration by performing operations 425, 430, 435, and 440 of FIG. 4.

In operation 715, the electronic device 101 may perform a VoIP call (e.g., a VoLTE call) based on a cellular network associated with the first SIM 201. For example, the electronic device 101 may perform an incoming call or an outgoing call associated with the first SIM 201. When the first SIM 201 is engaged in a VoIP call based on the cellular network, it will virtually monopolize the antenna 213, and prevent SIM 202 from using antenna 213.

To alleviate this, in operation 720, the electronic device 101 may perform IMS re-registration of the second SIM 202 with the second server 290 based on a Wi-Fi network. For example, the electronic device 101 may perform the IMS re-registration by performing operations 605 and 610 of FIG. 6.

The electronic device 101 may perform operation 720 based on a specified condition. For example, the specified condition may include at least one of performance of a voice call, network availability, a Wi-Fi network state, and/or a priority of a packet data network (PDN) associated with the second SIM 202.

While operation 715 is performed, the electronic device 101 may perform operation 720. For example, when the call according to operation 715 continues over a specified time, the electronic device 101 may perform IMS re-registration based on Wi-Fi (operation 720).

The electronic device 101 may perform IMS re-registration based on Wi-Fi (operation 720) based on network availability (e.g., ePDG availability) associated with the second SIM 202. For example, when a network provider (e.g., an MNO) associated with the second SIM 202 supports interworking (e.g., an ePDG) between a 3GPP network and a non-3GPP network, the electronic device 101 may perform the IMS re-registration based on Wi-Fi (operation 720). The electronic device 101 may receive network availability information from a network associated with the second SIM 202.

The electronic device 101 may perform the IMS re-registration based on Wi-Fi (operation 720) based on a Wi-Fi network state. For example, when there is an AP having an internet connection, when there is a connectable AP, and/or when a receive power of a signal from the AP is greater than or equal to a specified value, the electronic device 101 may perform the IMS re-registration based on Wi-Fi (operation 720).

When a priority of a PDN associated with the second SIM 202 is lower than a specified priority, the electronic device 101 may perform the IMS re-registration based on Wi-Fi (operation 720).

In operation 725, the electronic device 101 may perform IMS re-registration based on a cellular network for the second SIM 202. For example, the electronic device 101 may perform IMS re-registration based on the cellular network (operation 725) by performing operations 615 and 620 of FIG. 6.

In FIG. 7, although it is described as the voice call in operation 715, the voice call is merely illustrative, and operation 715 may refer to a packet service associated with the first SIM 201. For example, operation 715 may be performing a chat, file transmission and reception, and/or message transmission and reception, associated with the first SIM 201, or any other communication with high enough priority to monopolizes antenna 213. For example, registration of the second SIM 202 can be configured to occur when the first SIM 201 is engaged in a communication exceeding a priority for signals for performing IMS registration of the second SIM 202, in excess of a predetermined time period.

Figure 8:
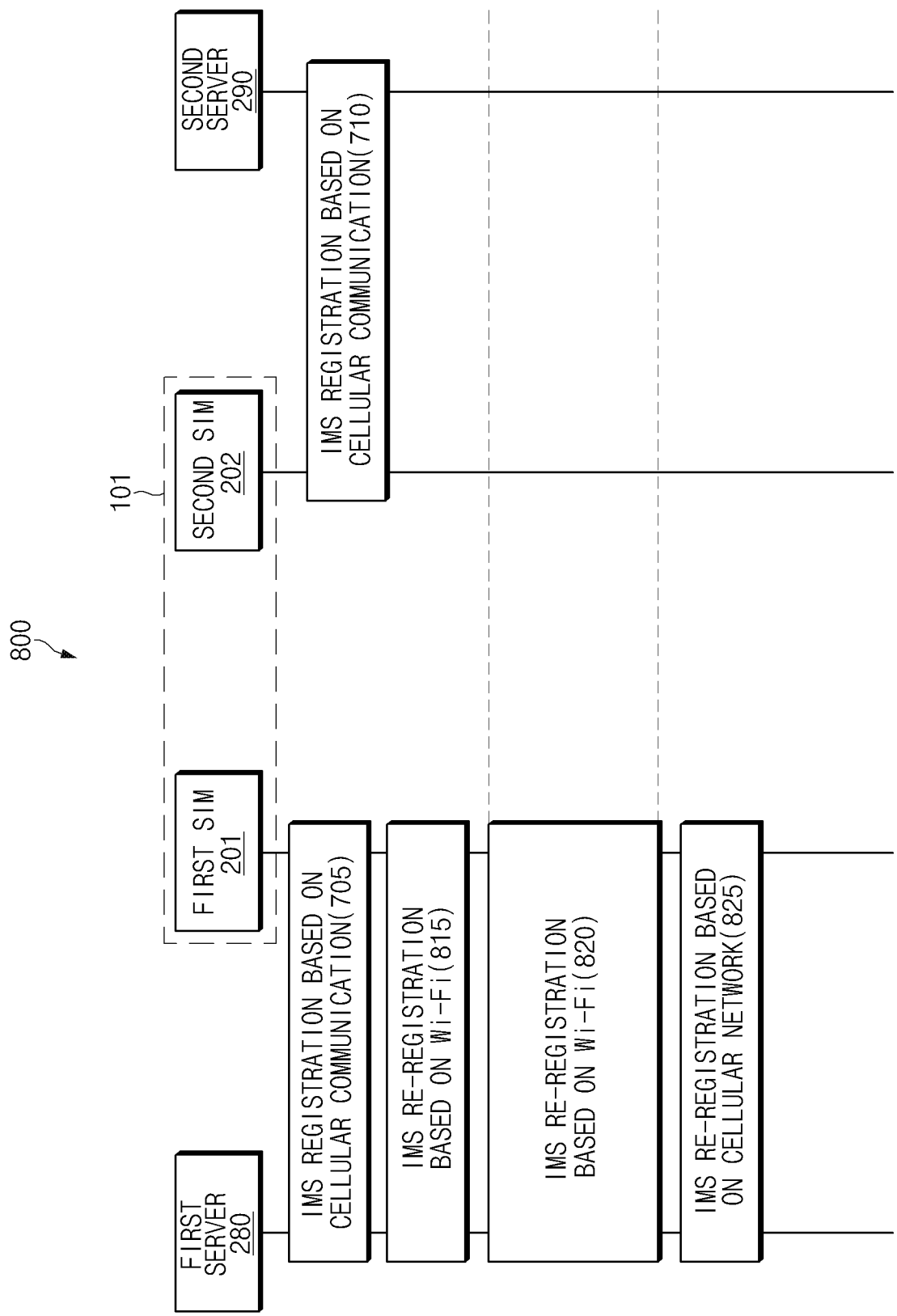
FIG. 8 is a signal sequence diagram illustrating a hand-over method of a first SIM according to certain embodiments.

FIG. 8 is a signal sequence diagram 800 illustrating a hand-over method of a first SIM according to certain embodiments.

In FIG. 7, the description is given of the hand-over method for the second SIM 202 (e.g., the second SIM 202 of FIG. 2A). However, in an embodiment, the hand-over for the second SIM 202 may fail to be supported. For example, a network associated with the second SIM 202 may fail to support interworking (e.g., an ePDG) between a 3GPP network and a non-3GPP network. On the other hand, a network associated with a first SIM 201 (e.g., a first SIM 201 of FIG. 1) may support the interworking (e.g., the ePDG) between the 3GPP network and the non-3GPP network. For example, an electronic device 101 (e.g., an electronic device 101 of FIG. 2A) may perform hand-over for the first SIM 201 to prevent an IMS service for the second SIM 202 from pausing. In FIG. 8, operations having the same reference numerals as those in FIG. 7 may refer to the detailed description with reference to FIG. 7.

In operation 815, the electronic device 101 may perform IMS re-registration based on Wi-Fi. For example, the electronic device 101 may transmit a re-registration message including access network information indicating a Wi-Fi network to a first server 280 (e.g., a first server 280 of FIG. 2A). The access network information (e.g., PANI) may indicate a non-3GPP-based network (e.g., an IEEE-based network).

The electronic device 101 may perform IMS re-registration based on Wi-Fi (operation 815) based on network availability (e.g., ePDG availability) associated with the first SIM 201. For example, when a network provider (e.g., an MNO) associated with the first SIM 201 supports the interworking (e.g., the ePDG) between the 3GPP network and the non-3GPP network, the electronic device 101 may perform the IMS re-registration based on Wi-Fi (operation 815). The electronic device 101 may receive network availability information from a network associated with the first SIM 201.

The electronic device 101 may perform the IMS re-registration based on Wi-Fi (operation 815) based on a Wi-Fi network state. For example, when there is an AP having an internet connection, when there is a connectable AP, and/or when a receive power of a signal from the AP is greater than or equal to a specified value, the electronic device 101 may perform the IMS re-registration based on Wi-Fi (operation 815).

In operation 820, the electronic device 101 may perform a VoIP call (e.g., a VoWiFi call) based on the non-3GPP network associated with the first SIM 201. For example, the electronic device 101 may perform an incoming call or an outgoing call associated with the first SIM 201. Although it is described as the voice call in operation 820, the voice call is merely illustrative, and operation 820 may refer to a packet service associated with the first SIM 201. For example, operation 820 may be performing a chat, file transmission and reception, and/or message transmission and reception associated with the first SIM 201.

In operation 825, the electronic device 101 may perform IMS re-registration based on a cellular network. For example, the electronic device 101 may transmit a re-registration message including access network information indicating the 3GPP network to the first server 280. The access network information (e.g., PANI) may indicate a 3GPP-based network (e.g., the cellular network).

Figure 9:
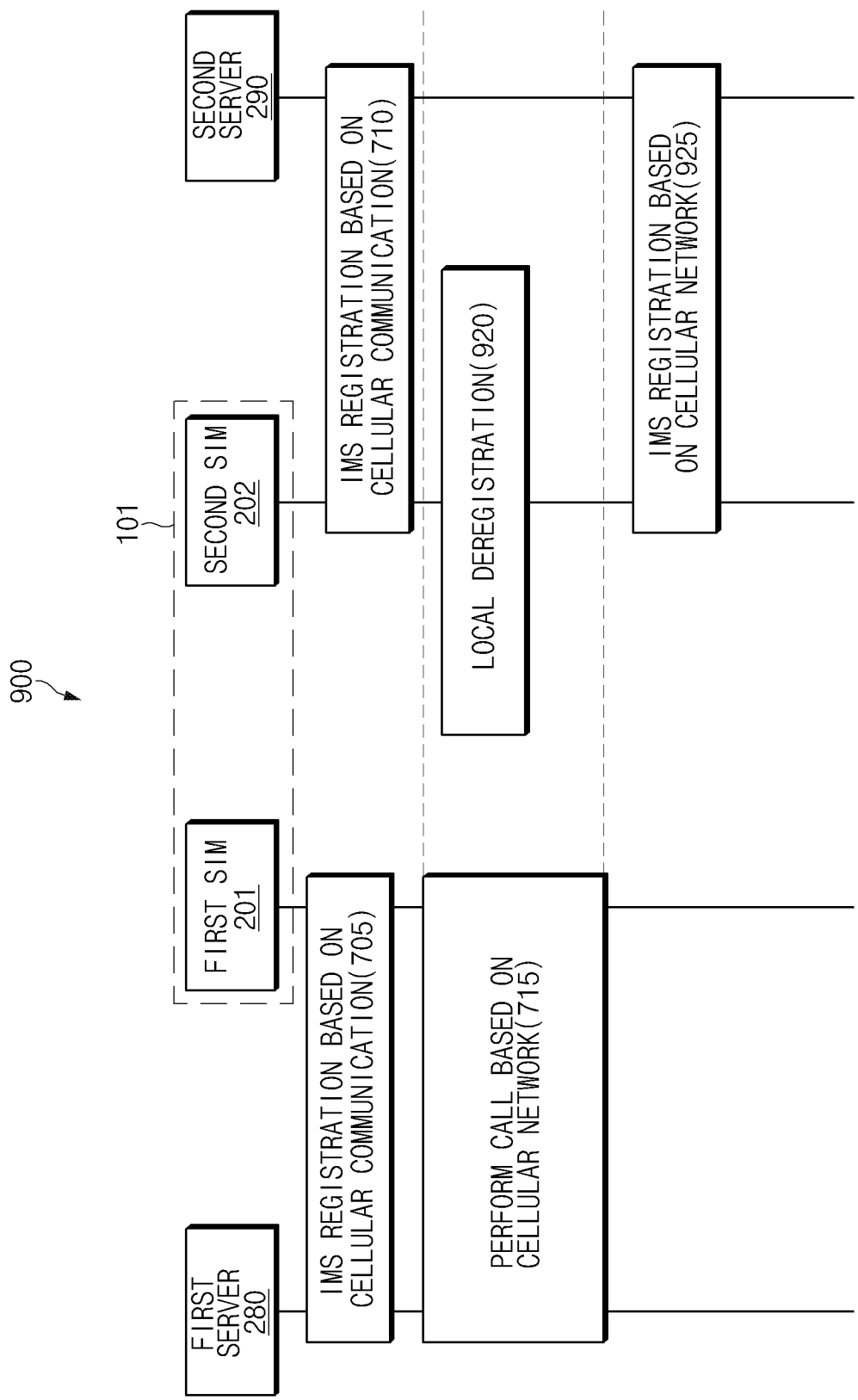
FIG. 9 is a signal sequence diagram illustrating a method for changing a state of a second SIM according to certain embodiments.

FIG. 9 is a signal sequence diagram illustrating a method for changing a state of a second SIM according to certain embodiments.

In FIG. 7, the description is given of the hand-over method for the second SIM 202 (e.g., the second SIM 202 of FIG. 2A). However, in an embodiment, hand-over for a first SIM 201 (e.g., a first SIM 201 of FIG. 2A) and the second SIM 202 may fail to be supported. For example, a network associated with each of the first SIM 201 and the second SIM 202 may fail to support interworking (e.g., an ePDG) between a 3GPP network and a non-3GPP network. For another example, although the first SIM 201 does not support hand-over and the second SIM 202 supports hand-over, there may be no available AP (e.g., an AP which is connectable and has an internet connection) or a receive power of a signal from an AP may be less than a specified value. In this case, hand-over for the second SIM 202 may fail to be performed.

On the other hand, according to an embodiment, a network associated with the first SIM 201 (e.g., the first SIM 201 of FIG. 2A) may support the interworking (e.g., the ePDG) between the 3GPP network and the non-3GPP network. For example, an electronic device 101 (e.g., an electronic device 101 of FIG. 2A) may perform hand-over for the first SIM 201 to prevent an IMS service for the second SIM 202 from pausing. In FIG. 9, operations having the same reference numerals as those in FIG. 7 may refer to the detailed description with reference to FIG. 7.

According to an embodiment, as a call based on a cellular network associated with the first SIM 201 is performed (operation 715), the IMS service for the second SIM 202 may be suspended. Thus, the electronic device 101 may fail to receive a notification for the second SIM 202 from the second server 290 (e.g., the second server 290 of FIG. 2A). Furthermore, the electronic device 101 may fail to receive information (e.g., a re-registration message) associated with the second SIM 202 to the second server 290. According to an embodiment, the second server 290 may identify a state where the second SIM 202 is registered, at a specified period. For example, when a re-registration message associated with the second SIM 202 is not received before a specified timer expires, the second server 290 may determines that the second SIM 202 expires. Thus, when a timer of the second server 290 expires during the call based on the cellular network (operation 715) associated with the first SIM 201, the second server 290 may determine that the second SIM 202 expires, whereas the electronic device 101 may determine that the second SIM 202 is registered. Thus, to match SIM registration states between a server and a terminal, the electronic device 101 may perform local deregistration (operation 920) and IMS registration based on the cellular network (operation 925).

In operation 920, the electronic device 101 may perform local deregistration for the second SIM 202. For example, when a timer (e.g., a registration timer) associated with the second SIM 202 expires, the electronic device 101 may perform the local deregistration (operation 920).

In operation 925, the electronic device 101 may perform IMS registration based on the cellular network for the second SIM 202. For example, the electronic device 101 may perform the IMS registration (e.g., operations 425, 430, 435, and 440) described in detail with reference to FIG. 4 to perform the IMS registration based on the cellular network (operation 925). According to an embodiment, after the call based on the cellular network (operation 715) associated with the first SIM 201 is terminated, the electronic device 101 may perform the IMS registration based on the cellular network (operation 925) for the second SIM 202.

Figure 10:
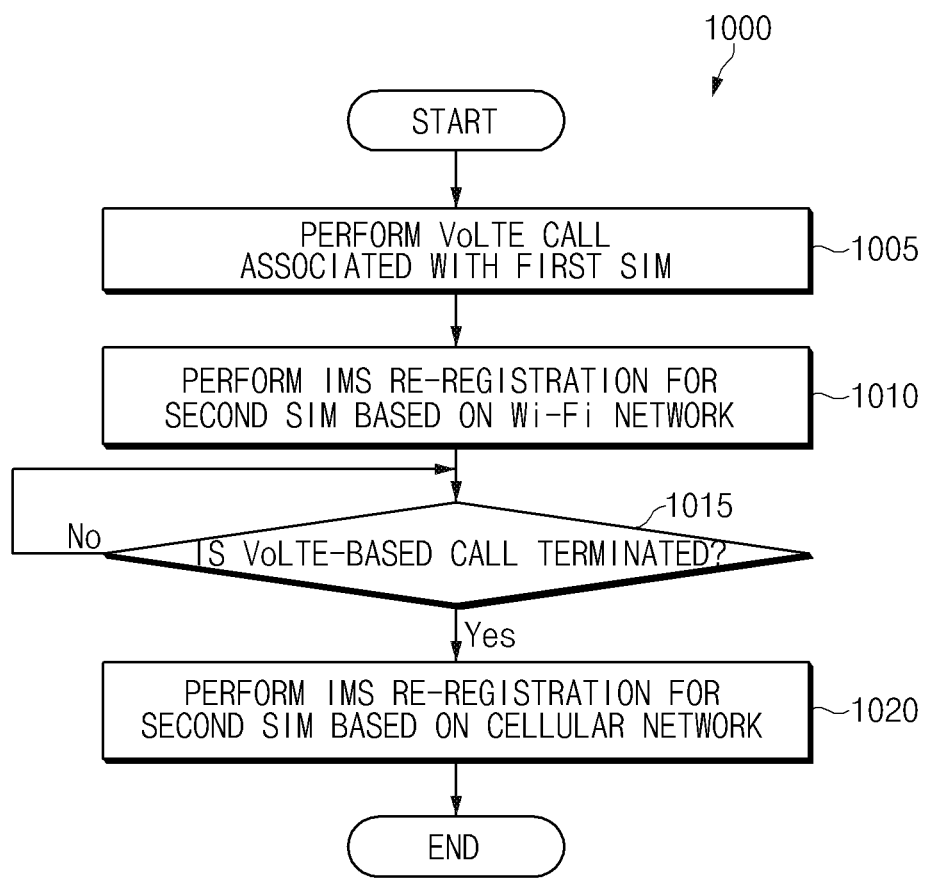
FIG. 10 is a flowchart illustrating a hand-over method according to certain embodiments.

FIG. 10 is a flowchart 1000 illustrating a hand-over method according to certain embodiments. Generally during a call associated with the first SIM 201, the second SIM 202 re-registers using the Wi-fi network. When the call by the first SIM 201 is terminated, the second SIM 202 re-registered using the cellular network.

According to an embodiment, each of a first SIM (e.g., a first SIM 201 of FIG. 2A) and a second SIM (e.g., a second SIM 202 of FIG. 2A) of an electronic device (e.g., an electronic device 101 of FIG. 2A) may use a 3GPP network as an access network to be registered with a first server (e.g., a first server 280 of FIG. 2A) or a second server (e.g., a second server 290 of FIG. 2A).

In operation 1005, a processor of the electronic device 101 (e.g., a processor 120 of FIG. 1) may perform a VoLTE call associated with the first SIM 201. The electronic device 101 may perform the VoLTE call using a first communication module (e.g., a first communication module 203 of FIG. 2A). The electronic device 101 may perform the VoLTE call using a first RF resource associated with the first communication module 203.

In operation 1010, the processor 120 of the electronic device 101 may perform IMS re-registration for the second SIM 202 based on a Wi-Fi network (e.g., a non-3GPP network). The processor 120 may transmit a registration message or a re-registration message including access network information to a server (e.g., a second server 290 of FIG. 2A) associated with the second SIM 202 using a second communication module (e.g., a second communication module 204 of FIG. 2A). For example, the electronic device 101 may transmit a registration or re-registration message in which the access network information is set to the non-3GPP network to perform the IMS re-registration for the second SIM 202.

In operation 1015, the processor 120 may determine whether a VoLTE-based call associated with the first SIM 201 is terminated. For example, the processor 120 may monitor a VoLTE call associated with the first SIM 201.

When the VoLTE-based call is terminated, in operation 1020, the processor 120 may perform the IMS re-registration for the second SIM 202 based on a cellular network (e.g., a 3GPP network). The processor 120 may transmit a registration message or a re-registration message including access network information to the server (e.g., the second server 290 of FIG. 2A) associated with the second SIM 202 using the first communication module 203. For example, the electronic device 101 may transmit a registration or re-registration message in which the access network information is set to a 3GPP network to perform the IMS re-registration for the second SIM 202.

Figure 11:
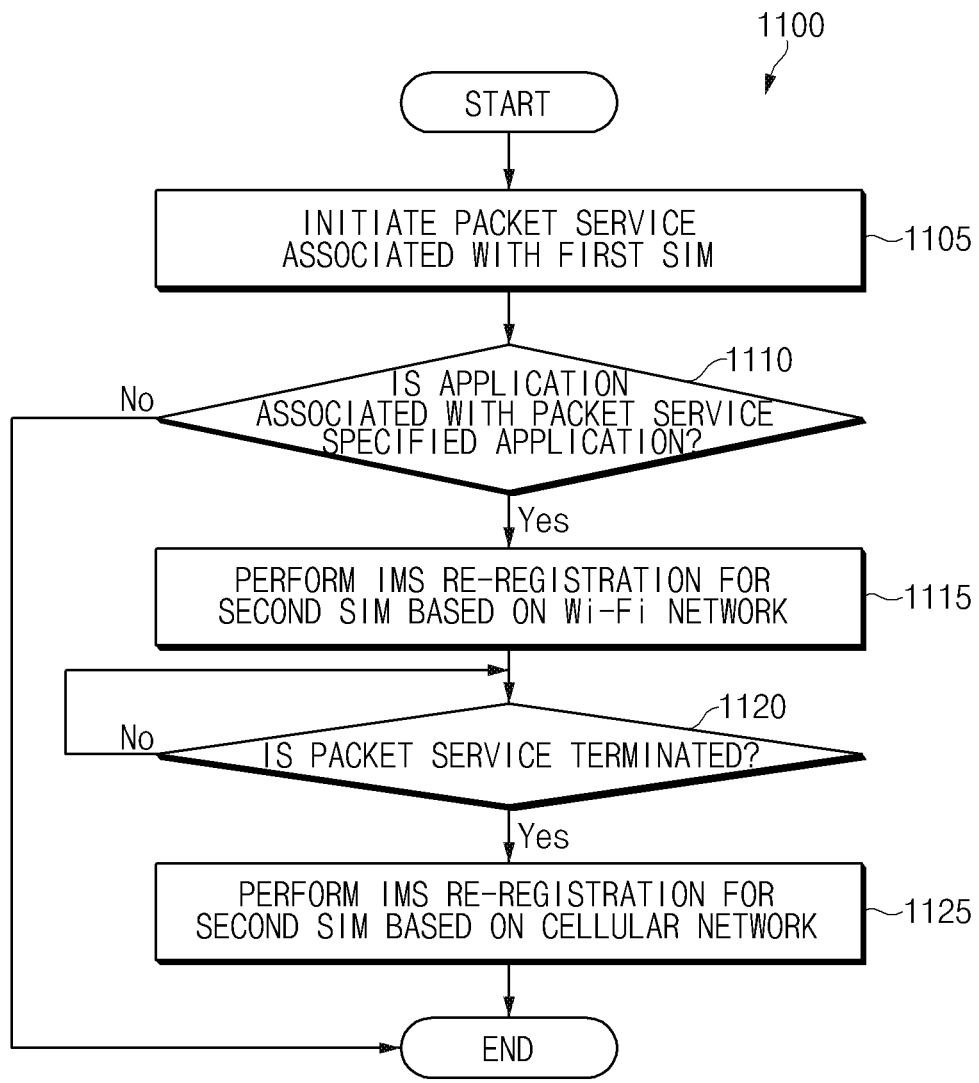
FIG. 11 is a flowchart illustrating a hand-over method based on priority according to certain embodiments.

FIG. 11 is a flowchart 1100 illustrating a hand-over method based on priority according to certain embodiments. Generally, when the first SIM 201 is associated with an on-going communication with a sufficiently high priority that effectively monopolizes an antenna 213 to the cellular network, the second SIM 202 re-registers using the Wi-Fi network. When the on-going communication with the sufficiently high priority is terminated, the second SIM 202 re-registers with the cellular network.

Each of a first SIM (e.g., a first SIM 201 of FIG. 2A) and a second SIM (e.g., a second SIM 202 of FIG. 2A) of an electronic device (e.g., an electronic device 101 of FIG. 2A) may use a 3GPP network as an access network to be registered with a first server (e.g., a first server 280 of FIG. 2A) or a second server (e.g., a second server 290 of FIG. 2A).

In operation 1105, a processor of the electronic device 101 (e.g., a processor 120 of FIG. 1) may initiate a packet service associated with the first SIM 201. For example, the processor 120 may transmit and receive packet data associated with the first SIM 201 using a first communication module (e.g., a communication module 203 of FIG. 2A).

In operation 1110, the processor 120 may determine whether an application associated with the packet service is a specified application. According to an embodiment, the specified application may include an application including packet data transmission and reception of greater than or equal to a specified time and/or specified capacity. For example, the specified application may include a call application, a message application, a file transfer application, and/or a chat application.

According to an embodiment, when the application associated with the packet service corresponds to the specified application, the processor 120 may hand over to a non-3GPP network for the second SIM 202. According to an embodiment, in operation 1115, the processor 120 may perform IMS re-registration for the second SIM 202 based on a Wi-Fi network (e.g., a non-3GPP network). The processor 120 may transmit a registration message or a re-registration message including access network information to a server (e.g., a second server 290 of FIG. 2A) associated with the second SIM 202 using a second communication module (e.g., a second communication module 204 of FIG. 2A). For example, the electronic device 101 may transmit a registration or re-registration message in which the access network information is set to the non-3GPP network to perform the IMS re-registration for the second SIM 202.

In operation 1120, the processor 120 may determine whether a packet service associated with the first SIM 201 is terminated. For example, the processor 120 may monitor the packet service associated with the first SIM 201.

When the packet service is terminated, in operation 1125, the processor 120 may perform the IMS re-registration for the second SIM 202 based on a cellular network (e.g., a 3GPP network). The processor 120 may transmit a registration message or a re-registration message including access network information to the server (e.g., the second server 290 of FIG. 2A) associated with the second SIM 202 using the first communication module 203. For example, the electronic device 101 may transmit a registration or re-registration message in which the access network information is set to the 3GPP network to perform the IMS re-registration for the second SIM 202.

Figure 12:
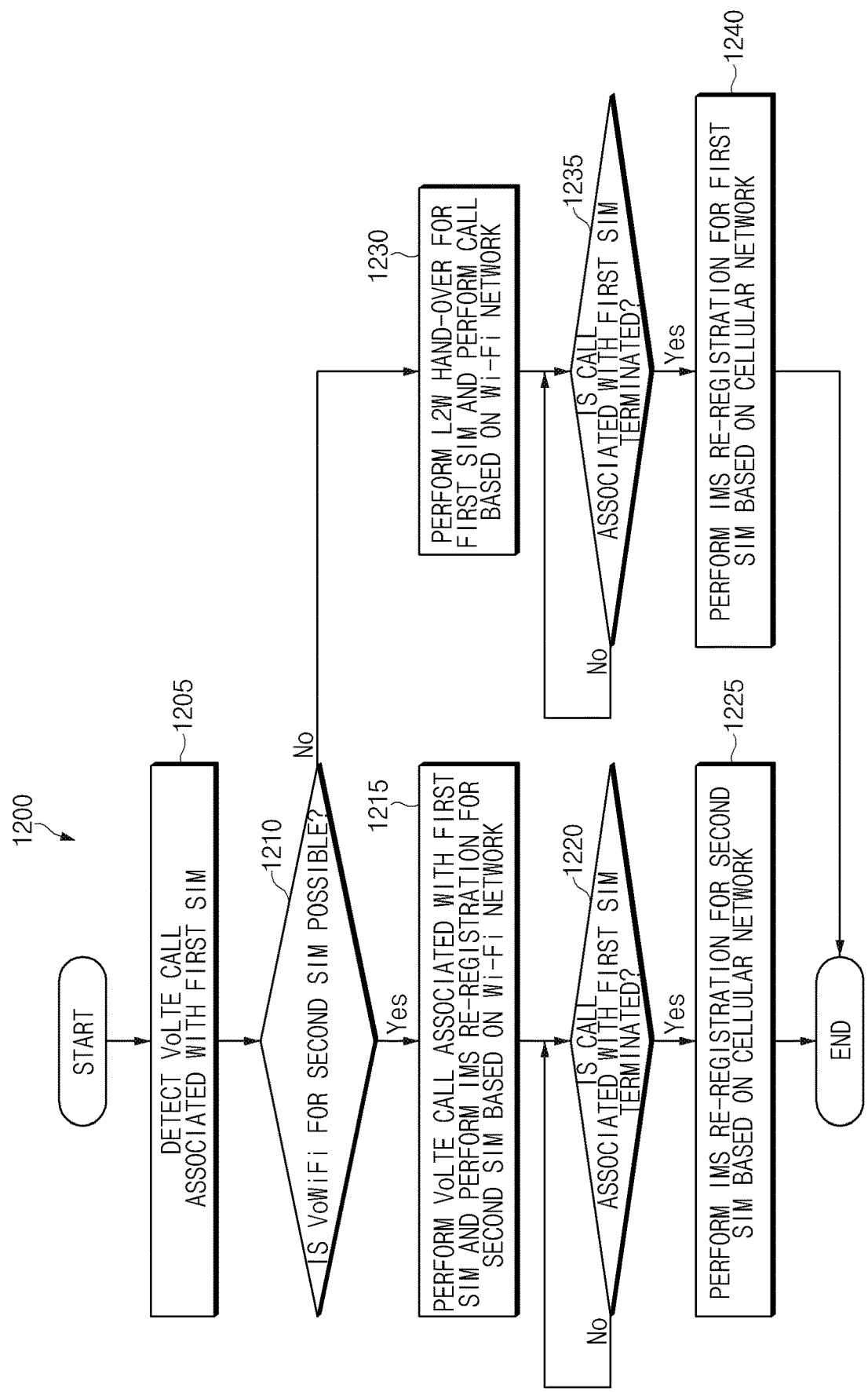
FIG. 12 is a flowchart illustrating a hand-over method based on a capability of a second SIM according to certain embodiments.

FIG. 12 is a flowchart 1200 illustrating a hand-over method based on a capability of a second SIM according to certain embodiments. Generally, in FIG. 12, when the first SIM 201 is engaged VoLTE call, a determination is made whether the second SIM 202 can engage in VoWifi call. If the second SIM 202 cannot engage in VoWifi call, the first SIM 201 is handed over from the LTE network to the Wi-Fi network (L2 W hand-over).

Each of a first SIM (e.g., a first SIM 201 of FIG. 2A) and a second SIM (e.g., a second SIM 202 of FIG. 2A) of an electronic device (e.g., an electronic device 101 of FIG. 2A) may use a 3GPP network as an access network to be registered with a first server (e.g., a first server 280 of FIG. 2A) or a second server (e.g., a second server 290 of FIG. 2A).

In operation 1205, a processor of the electronic device 101 (e.g., a processor 120 of FIG. 1) may detect a VoLTE call associated with the first SIM 201.

In operation 1210, the processor 120 may determine whether VoWiFi for the second SIM 202 is possible. For example, when an MNO or network associated with the second SIM 202 supports the VoWiFi or an ePDG and when Wi-Fi is available, the processor 120 may determine that the VoWiFi for the second SIM 202 is possible. According to an embodiment, when there is a connectable AP having an internet connection and when a received signal strength indication (RSSI) from the AP is greater than or equal to a specified value, the processor 120 may determine that the Wi-Fi is available. For example, when the MNO or network associated with the second SIM 202 does not support the VoWiFi or the ePDG or when the Wi-Fi is unavailable, the processor 120 may determine that the VoWiFi for the second SIM 202 is impossible.

In operation 1215, when it is determined that the VoWiFi for the second SIM 202 is possible, the processor 120 may perform a VoLTE call associated with the first SIM 201 and may perform IMS re-registration for the second SIM 202 based on a Wi-Fi network. For example, the processor 120 may perform the VoLTE associated with the first SIM 201 (operation 1005 of FIG. 10) and may perform the IMS re-registration for the second SIM 202 based on the Wi-Fi network (operation 1010 of FIG. 10) to perform operation 1215. Through the IMS re-registration for the second SIM 202, the processor 120 may perform LTE to Wi-Fi (L2 W) hand-over for the second SIM 202.

In operation 1220, the processor 120 may determine whether a call (e.g., a VoLTE call) associated with the first SIM 201 is terminated.

When the call associated with the first SIM 201 is terminated, in operation 1225, the processor 120 may perform the IMS re-registration for the second SIM 202 based on a cellular network (e.g., a 3GPP network). For example, the description of operation 1225 may refer to the description of operation 1020 of FIG. 10.

When it is determined that the VoWiFi for the second SIM 202 is impossible, in operation 1230, the processor 120 may perform L2 W hand-over for the first SIM 201 and may perform the call (e.g., a VoWiFi call) based on the Wi-Fi network. For example, the processor 120 may perform IMS registration based on Wi-Fi (e.g., operation 815 of FIG. 8) and a call based on a Wi-Fi network (e.g., operation 820 of FIG. 8) to perform operation 1230.

In operation 1235, the processor 120 may determine whether the call (e.g., the VoWiFi call) associated with the first SIM 201 is terminated.

When the call associated with the first SIM 201 is terminated, in operation 1240, the processor 120 may perform IMS re-registration for the first SIM 201 based on the cellular network (e.g., the 3GPP network). For example, the processor 120 may perform the IMS re-registration based on the cellular network (e.g., operation 825 of FIG. 8) to perform operation 1230.

Figure 13:
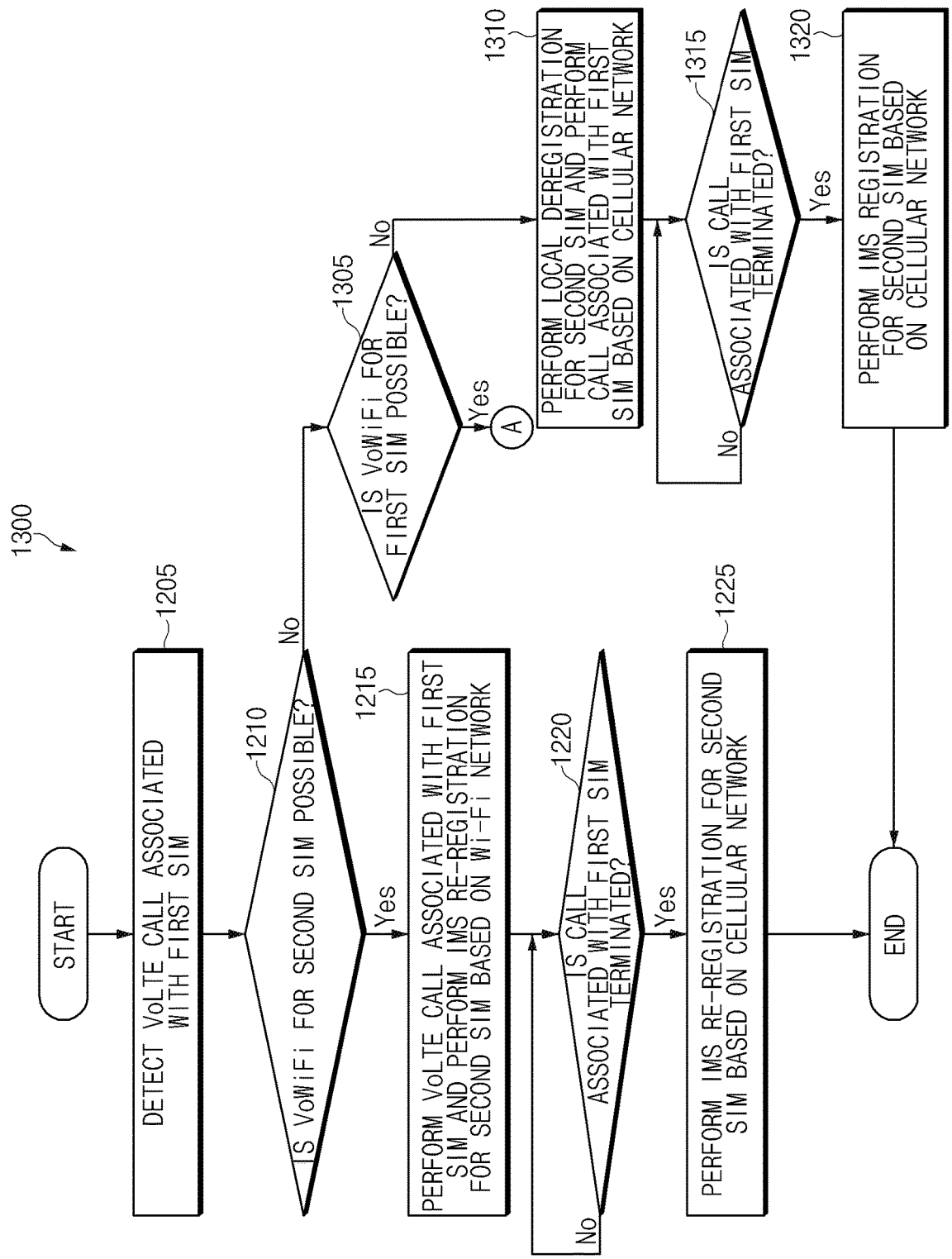
FIG. 13 is a flowchart illustrating a hand-over method based on capabilities of a first SIM and a second SIM according to certain embodiments.

FIG. 13 is a flowchart 1300 illustrating a hand-over method based on capabilities of a first SIM and a second SIM according to certain embodiments.

In FIG. 13, operations having the same reference numerals as those in FIG. 12 may refer to the description associated with FIG. 12. For convenience of description, a repeated description may be omitted. Unless described differently below, the details described with reference to FIG. 12 are applicable to operations of FIG. 13.

In operation 1305, when VoWiFi for a second SIM (e.g., a second SIM 202 of FIG. 2A) is impossible, a processor (e.g., a processor 120 of FIG. 2A) may determine whether VoWiFi for a first SIM (e.g., a first SIM 201 of FIG. 2A) is possible. For example, when an MNO or network associated with the first SIM 201 supports VoWiFi or an ePDG and when Wi-Fi is available, the processor 120 may determine that the VoWiFi for the first SIM 201 is possible. According to an embodiment, when there is a connectable AP having an internet connection and when an RSSI from the AP is greater than or equal to a specified value, the processor 120 may determine that the Wi-Fi is available. For example, when the MNO or network associated with the first SIM 201 does not support the VoWiFi and the ePDG or when the Wi-Fi is unavailable, the processor 120 may determine that the VoWiFi for the first SIM 201 is impossible.

When it is determined that the VoWiFi for the first SIM 201 is possible, the processor 120 may perform the method according to reference point A of FIG. 12. For example, the processor 120 may perform L2 W hand-over for the first SIM and a call based on a Wi-Fi network (operation 1230 of FIG. 12), may determine whether a call associated with the first SIM is terminated (operation 1235 of FIG. 12), and may perform IMS registration for the first SIM (operation 1240 of FIG. 12).

When it is determined that the VoWiFi for the first SIM 201 is impossible, the processor 120 may perform local deregistration for the second SIM 202 and may perform the call associated with the first SIM 201 based on the cellular network. For example, the processor 120 may perform the call based on the cellular network (operation 715 of FIG. 9) and the local deregistration (e.g., operation 920 of FIG. 9) to perform operation 1310. According to an embodiment, while the call associated with the first SIM 201 is performed, when a timer (e.g., a re-registration timer) associated with the second SIM 202 expires, the processor 120 may perform deregistration.

In operation 1315, the processor 120 may determine whether the call associated with the first SIM 201 is terminated.

In operation 1320, the processor 120 may perform IMS registration for the second SIM 202 based on the cellular network. For example, the processor 120 may perform the IMS registration based on the cellular network (operation 925 of FIG. 9) to perform operation 1320.

According to certain embodiments, an electronic device (e.g., an electronic device 101 of FIG. 2A) may include a first subscriber identity module (SIM) (e.g., a first SIM 201 of FIG. 2A) and a second SIM (e.g., a second SIM 202 of FIG. 2A), a first communication circuitry (e.g., a first communication module of FIG. 2A) configured to perform wireless communication over a cellular network (e.g., a second network 199 of FIG. 1), a second communication circuitry (e.g., a second communication module 204 of FIG. 2A) configured to perform wireless communication over a Wi-Fi network (e.g., a first network 198 of FIG. 1), and a processor (e.g., a processor 120 of FIG. 2A) operatively connected with the first SIM, the second SIM, the first communication circuitry, and the second communication circuitry. The processor may be configured to perform a packet-based call associated with the first SIM using the first communication circuitry and transmit a first re-registration message (e.g., an SIP REGISTER message) for internet protocol multimedia subsystem (IMS) re-registration for the second SIM to a network associated with the second SIM using the second communication circuitry, in response to the packet-based call associated with the first SIM.

The cellular network may include a long term evolution (LTE) network, and the packet-based call associated with the first SIM may include a voice over LTE (VoLTE) call.

The processor may be configured to, when the packet-based call associated with the first SIM is terminated, transmit a second re-registration message (e.g., an SIP REGISTER message) for the IMS re-registration for the second SIM to the network associated with the second SIM using the first communication circuitry.

The first re-registration message may include access network information indicating an institute of electrical and electronics engineers (IEEE) standard, and the second re-registration message may include access network information indicating $3^{rd}$ generation partnership project (3GPP).

According to an embodiment, the processor may be configured to, when the network associated with the second SIM supports interworking between the cellular network and the Wi-Fi network, transmit the first re-registration message.

According to an embodiment, the processor may be configured to, when an access point (AP) (e.g., an AP 241 of FIG. 2A) associated with the Wi-Fi network has an internet connection, when a receive power of a signal received from the AP is greater than or equal to a specified value, and when the electronic device is connectable to the AP, transmit the first re-registration message.

According to an embodiment, the first communication circuitry may be configured to process packet data associated with the first SIM and packet data associated with the second SIM one at a time based on priorities.

According to certain embodiments, an electronic device (e.g., an electronic device 101 of FIG. 2A) may include a first subscriber identity module (SIM) (e.g., a first SIM 201 of FIG. 2A) and a second SIM (e.g., a second SIM 202 of FIG. 2A), a first communication circuitry (e.g., a first communication module 203 of FIG. 2A) configured to perform wireless communication over a cellular network (e.g., a second network 199 of FIG. 1), a second communication circuitry (e.g., a second communication module 204 of FIG. 2A) configured to perform wireless communication over a Wi-Fi network (e.g., a first network 198 of FIG. 1), and a processor (e.g., a processor 120 of FIG. 2A) operatively connected with the first SIM, the second SIM, the first communication circuitry, and the second communication circuitry. The processor may be configured to, when detecting a voice over long term evolution (VoLTE) call associated with the first SIM, determine whether voice over Wi-Fi (VoWiFi) for the second SIM is supported, when the VoWiFi for the second SIM is supported, perform a VoLTE call associated with the first SIM using the first communication module, and transmit a first re-registration message (e.g., an SIP REGISTER message) for internet protocol multimedia subsystem (IMS) re-registration for the second SIM using the second communication circuitry.

According to an embodiment, the processor may be configured to, when the VoLTE associated with the first SIM is terminated, transmit a second re-registration message (e.g., an SIP REGISTER message) for the IMS re-registration for the second SIM to a network associated with the second SIM using the first communication circuitry.

According to an embodiment, the first re-registration message may include access network information indicating institute of electrical and electronics engineers (IEEE), and the second re-registration message may include access network information indicating $3^{rd}$ generation partnership project (3GPP).

According to an embodiment, the processor may be configured to, when the VoWiFi for the second SIM is not supported, perform hand-over from the cellular network to the Wi-Fi network with respect to the first SIM and perform the VoLTE call associated with the first SIM using the second communication circuitry.

According to an embodiment, the processor may be configured to perform the hand-over by transmitting a re-registration message including access network information indicating IEEE.

According to an embodiment, the processor may be configured to, when VoWiFi for the first SIM and the second SIM is not supported, perform local deregistration for the second SIM and perform the VoLTE call associated with the first SIM using the first communication circuitry.

According to an embodiment, the processor may be configured to determine whether the second SIM supports the VoWiFi based on whether a network associated with the second SIM supports interworking between the cellular network and the Wi-Fi network.

According to certain embodiments, an electronic device (e.g., an electronic device 101 of FIG. 2A) may include a first subscriber identity module (SIM) (e.g., a first SIM 201 of FIG. 2A) storing first subscriber information, a second SIM (e.g., a second SIM 202 of FIG. 2A) storing second subscriber information, a first communication circuitry (e.g., a first communication module 203 of FIG. 2A) configured to provide first wireless communication (e.g., cellular wireless communication), a second communication circuitry (e.g., a second communication module 204 of FIG. 2A) configured to provide second wireless communication (e.g., Wi-Fi wireless communication), a processor (e.g., a processor 120 of FIG. 2A) operatively connected with the first communication circuitry and the second communication circuitry, and a memory (e.g., a memory 190 of FIG. 1) operatively connected with the processor. According to an embodiment, the memory may store instructions, when executed, causing the processor to generate a first registration request message (e.g., an SIP REGISTER message) based at least in part on the first subscriber information, transmit the first registration request message to a first external server (e.g., a first server 280 of FIG. 2A) using the first communication circuitry, generate a second registration request message (e.g., an SIP REGISTER message) based at least in part on the second subscriber information, transmit the second registration request message to a second external server (e.g., a second server 290 of FIG. 2A) using the first communication circuitry, connect voice communication based at least in part of the first subscriber information or data-based voice communication (e.g., VoLTE) using the first communication circuitry, after transmitting the first registration request message, generate a third registration request message based at least in part on the second subscriber information, after connecting the voice communication or the data-based voice communication, and transmit the third registration request message to the second external server using the second communication circuitry.

According to an embodiment, the first wireless communication may include cellular communication, and the second wireless communication may include short-range wireless communication (e.g., Wi-Fi).

According to an embodiment, the short-range wireless communication may include Wi-Fi communication.

According to an embodiment, the first external server and the second external server may be configured to support an internet protocol multimedia subsystem (IMS).

According to an embodiment, the first registration request message may include information associated with the first communication circuitry, the second registration request message may include information associated with the first communication circuitry, and the third registration request message may include information associated with the second communication circuitry.

According to an embodiment, at least one of the first registration request message, the second registration request message, or the third registration request message may include a session initiation protocol (SIP) REGISTER message defined by 3GPP standard.

According to an embodiment, the SIP REGISTER message may include a P-access-network-info (PANI) header. The PANI header may include information associated with the first communication circuitry or information associated with the second communication circuitry.

According to certain embodiments, a method for supporting a dual subscriber identity module (SIM) in an electronic device (e.g., an electronic device 101 of FIG. 2A) may include performing a packet-based call (e.g., a VoLTE call) associated with a first SIM (e.g., a first SIM 201 of FIG. 2A) using a first communication circuitry (e.g., a first communication module 203 of FIG. 2A) configured to perform wireless communication over a cellular network (e.g., a second network 199 of FIG. 1) and transmitting a first re-registration message (e.g., an SIP REGISTER message) for internet protocol multimedia subsystem (IMS) re-registration for the second SIM to a network associated with a second SIM (e.g., a second SIM 201 of FIG. 2A) using a second communication circuitry (e.g., a second communication module 204 of FIG. 2A) configured to perform wireless communication over a Wi-Fi network (e.g., a first network 198 of FIG. 1), in response to the packet-based call associated with the first SIM.

According to an embodiment, the cellular network may include a long term evolution (LTE) network, and the packet-based call associated with the first SIM may include a voice over LTE (VoLTE) call.

According to an embodiment, the method may further include, when the packet-based call associated with the first SIM is terminated, transmitting a second re-registration message for IMS re-registration for the second SIM to the network associated with the second SIM using the first communication circuitry.

According to an embodiment, the first re-registration message may include access network information indicating institute of electrical and electronics engineers (IEEE), and the second re-registration message may include access network information indicating $3^{rd}$ generation partnership project (3GPP).

According to an embodiment, the transmitting of the first re-registration message may include, when the network associated with the second SIM supports interworking between the cellular network and the Wi-Fi network, transmitting the first re-registration message.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, or hardware programmed with software, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

According to certain embodiments disclosed in the disclosure, the electronic device may support a dual SIM dual active function by handing over the other SIM during a voice call.

According to certain embodiments disclosed in the disclosure, the electronic device may provide smooth communication by matching SIM state information between a server and the electronic device.

In addition, various effects directly or indirectly ascertained through the disclosure may be provided.

While the disclosure has been shown and described with reference to certain embodiments thereof, it will be understood by those skilled in the art that various changes in form and details may be made therein without departing from the spirit and scope of the disclosure as defined by the appended claims and their equivalents.

What is claimed is:

1. An electronic device, comprising:
a first subscriber identity module (SIM) and a second SIM;
a first communication circuitry configured to perform wireless communication over a cellular network;
a second communication circuitry configured to perform wireless communication over a Wi-Fi network; and
at least one processor operatively connected with the first SIM, the second SIM, the first communication circuitry, and the second communication circuitry,
wherein the at least one processor is configured to:
perform a packet-based call associated with the first SIM using the first communication circuitry, and transmit a first re-registration message for internet protocol multimedia subsystem (IMS) re-registration for the second SIM to a network associated with the second SIM using the second communication circuitry for performing the packet-based call associated with the second SIM using the second communication circuitry, while the packet-based call associated with the first SIM is performed using the first communication circuitry.

2. The electronic device of claim 1, wherein the cellular network includes a long term evolution (LTE) network, and wherein the packet-based call associated with the first SIM includes a voice over LTE (VoLTE) call.

3. The electronic device of claim 1, wherein the at least one processor is further configured to, when the packet-based call associated with the first SIM is terminated, transmit a second re-registration message for the IMS re-registration for the second SIM to the network associated with the second SIM using the first communication circuitry.

4. The electronic device of claim 3, wherein the first re-registration message includes access network information indicating an institute of electrical and electronics engineers (IEEE), and
wherein the second re-registration message includes access network information indicating 3rd generation partnership project (3GPP).

5. The electronic device of claim 1, wherein the at least one processor is further configured to, when the network associated with the second SIM supports interworking between the cellular network and the Wi-Fi network, transmit the first re-registration message.

6. The electronic device of claim 1, wherein the at least one processor is further configured to:
transmit the first re-registration message when an access point (AP) associated with the Wi-Fi network has an internet connection, when a receive power of a signal received from the AP is greater than or equal to a specified value, and when the electronic device is connectable to the AP.

7. The electronic device of claim 6, wherein the first communication circuitry is further configured to process one of packet data associated with the first SIM and packet data associated with the second SIM based on a priority of the packet data associated with the first SIM and a priority of the packet data associated with the second SIM.

8. An electronic device, comprising:
a first subscriber identity module (SIM) and a second SIM;
a first communication circuitry configured to perform wireless communication over a cellular network;
a second communication circuitry configured to perform wireless communication over a Wi-Fi network; and
at least one processor operatively connected with the first SIM, the second SIM, the first communication circuitry, and the second communication circuitry,
wherein the at least one processor is configured to:
in response to detecting a voice over long term evolution (VoLTE) call associated with the first SIM, determine whether voice over Wi-Fi (VoWiFi) for the second SIM is supported, and
when the VoWiFi for the second SIM is supported, perform the VoLTE call associated with the first SIM using the first communication circuitry and transmit a first re-registration message for internet protocol multimedia subsystem (IMS) re-registration for the second SIM to a network associated with the second SIM using the second communication circuitry for performing a packet-based call associated with the second SIM using the second communication circuitry.

9. The electronic device of claim 8, wherein the at least one processor is further configured to, when the VoLTE associated with the first SIM is terminated, transmit a second re-registration message for the IMS re-registration for the second SIM to a network associated with the second SIM using the first communication circuitry.

10. The electronic device of claim 9, wherein the first re-registration message includes access network information indicating an institute of electrical and electronics engineers (IEEE), and
wherein the second re-registration message includes access network information indicating 3rd generation partnership project (3GPP).

11. The electronic device of claim 8, wherein the at least one processor is further configured to:
when the VoWiFi for the second SIM is not supported, perform hand-over from the cellular network to the Wi-Fi network with respect to the first SIM; and
perform the VoLTE call associated with the first SIM using the second communication circuitry.

12. The electronic device of claim 11, wherein the at least one processor is further configured to perform the hand-over by transmitting a re-registration message including access network information indicating an IEEE.

13. The electronic device of claim 8, wherein the at least one processor is further configured to:
when VoWiFi for the first SIM and the second SIM is not supported, perform local deregistration for the second SIM; and
perform the VoLTE call associated with the first SIM using the first communication circuitry.

14. The electronic device of claim 8, wherein the at least one processor is further configured to determine whether the second SIM supports the VoWiFi based on whether a network associated with the second SIM supports interworking between the cellular network and the Wi-Fi network.

15. An electronic device, comprising:
a first subscriber identity module (SIM) storing first subscriber information;
a second SIM storing second subscriber information;
a first communication circuitry configured to provide first wireless communication;
a second communication circuitry configured to provide second wireless communication;
at least one processor operatively connected with the first communication circuitry and the second communication circuitry; and
a memory operatively connected with the at least one processor,
wherein the memory stores instructions, when executed, causing the at least one processor to perform a plurality of operation comprising:
generating a first registration request message based at least in part on the first subscriber information,
transmitting the first registration request message to a first external server using the first communication circuitry,
generating a second registration request message based at least in part on the second subscriber information,
transmitting the second registration request message to a second external server using the first communication circuitry,
connecting voice communication based at least in part of the first subscriber information or data-based voice communication using the first communication circuitry, after transmitting the first registration request message, and while connecting the voice communication or the data-based voice communication using the first communication circuitry:

generating a third registration request message based at least in part on the second subscriber information, and transmitting the third registration request message to the second external server using the second communication circuitry for performing a packet-based call associated with the second SIM using the second communication circuitry.

16. The electronic device of claim 15, wherein the first wireless communication includes cellular communication, and wherein the second wireless communication includes short-range wireless communication.

17. The electronic device of claim 16, wherein the short-range wireless communication includes Wi-Fi communication.

18. The electronic device of claim 15, wherein the first external server and the second external server are configured to support an internet protocol multimedia subsystem (IMS).

19. The electronic device of claim 15, wherein at least one of the first registration request message, the second registration request message, or the third registration request message includes a session initiation protocol (SIP) REGISTER message defined by 3GPP standard.

20. The electronic device of claim 19, wherein the SIP REGISTER message includes a P-access-network-info (PANI) header, and wherein the PANI header includes information associated with the first communication circuitry or information associated with the second communication circuitry.

* * * * *